(12) United States Patent
Gendai

(10) Patent No.: US 10,440,304 B2
(45) Date of Patent: Oct. 8, 2019

(54) IMAGE SENSOR AND ELECTRONIC DEVICE

(71) Applicant: SONY CORPORATION, Tokyo (JP)

(72) Inventor: Yuji Gendai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 149 days.

(21) Appl. No.: 15/025,179

(22) PCT Filed: Aug. 14, 2015

(86) PCT No.: PCT/JP2015/072950
§ 371 (c)(1),
(2) Date: Mar. 25, 2016

(87) PCT Pub. No.: WO2016/031595
PCT Pub. Date: Mar. 3, 2016

(65) Prior Publication Data
US 2016/0227144 A1 Aug. 4, 2016

(30) Foreign Application Priority Data
Aug. 26, 2014 (JP) .................................. 2014-171517

(51) Int. Cl.
*H04N 5/378* (2011.01)
*H04N 5/357* (2011.01)
(Continued)

(52) U.S. Cl.
CPC ............. *H04N 5/378* (2013.01); *H04N 5/357* (2013.01); *H04N 5/3658* (2013.01); *H04N 5/374* (2013.01)

(58) Field of Classification Search
CPC ...... H04N 5/378; H04N 5/3658; H04N 5/357; H04N 5/374; H04N 5/2328; H04N 7/10;
(Continued)

(56) References Cited

U.S. PATENT DOCUMENTS

2006/0220939 A1* 10/2006 Kirsch
2010/0283881 A1* 11/2010 Araki ................ H01L 27/14643
348/308

(Continued)

FOREIGN PATENT DOCUMENTS

| JP | 2003-338988 A | 11/2003 |
| JP | 2010-010896 A | 1/2010 |

(Continued)

*Primary Examiner* — Twyler L Haskins
*Assistant Examiner* — Tuan H Le
(74) *Attorney, Agent, or Firm* — Chip Law Group

(57) ABSTRACT

The present disclosure relates to an image sensor, an electronic device, and a method for generating a tessellation tile that allows pattern noise that can be generated in an image output from an image sensor including column ADCs or area ADCs to be less visible.

An image sensor according to a first aspect of the present disclosure includes analog digital converters (ADCs), each of the ADCs being provided for a column, wherein the ADCs associated with the respective columns are configured to read charge signals simultaneously from pixels arranged on lines different from one another of the respectively associated columns, the number of ADCs being a predetermined number corresponding to the number of columns, the columns being adjacent to one another. The present disclosure is applicable to any electronic device including an image sensor.

8 Claims, 23 Drawing Sheets

(51) Int. Cl.
 *H04N 5/374* (2011.01)
 *H04N 5/365* (2011.01)

(58) Field of Classification Search
 CPC ............... H05K 5/0004; H05K 5/0247; F16M
  11/2071; F16M 11/10; F16M 13/04;
  F16M 13/02; B64C 2201/127; B64C
  39/024; B64D 47/08
 See application file for complete search history.

(56) References Cited

U.S. PATENT DOCUMENTS

2013/0107087 A1* 5/2013 Okada .................... H04N 5/365
  348/280
2014/0183332 A1* 7/2014 Theuwissen

FOREIGN PATENT DOCUMENTS

| JP | 2011-091535 A | 5/2011 |
| JP | 2012-015587 A | 1/2012 |
| JP | 2012-124729 A | 6/2012 |
| JP | 2013-055500 A | 3/2013 |
| WO | 2012/132670 A1 | 10/2012 |

\* cited by examiner 0.3σ

| D1 | D2 | D3 | D4 | D1 | D2 | D3 | D4 | D1 | D2 | D3 | D4 |
|----|----|----|----|----|----|----|----|----|----|----|----|
| C1 | C2 | C3 | C4 | C1 | C2 | C3 | C4 | C1 | C2 | C3 | C4 |
| B1 | B2 | B3 | B4 | B1 | B2 | B3 | B4 | B1 | B2 | B3 | B4 |
| A1 | A2 | A3 | A4 | A1 | A2 | A3 | A4 | A1 | A2 | A3 | A4 |
| D1 | D2 | D3 | D4 | D1 | D2 | D3 | D4 | D1 | D2 | D3 | D4 |
| C1 | C2 | C3 | C4 | C1 | C2 | C3 | C4 | C1 | C2 | C3 | C4 |
| B1 | B2 | B3 | B4 | B1 | B2 | B3 | B4 | B1 | B2 | B3 | B4 |
| A1 | A2 | A3 | A4 | A1 | A2 | A3 | A4 | A1 | A2 | A3 | A4 |
| D1 | D2 | D3 | D4 | D1 | D2 | D3 | D4 | D1 | D2 | D3 | D4 |
| C1 | C2 | C3 | C4 | C1 | C2 | C3 | C4 | C1 | C2 | C3 | C4 |
| B1 | B2 | B3 | B4 | B1 | B2 | B3 | B4 | B1 | B2 | B3 | B4 |
| A1 | A2 | A3 | A4 | A1 | A2 | A3 | A4 | A1 | A2 | A3 | A4 |

*FIG. 11*

| D1 | D2 | D3 | D4 | D1 | D2 | D3 | D4 | D1 | D2 | D3 | D4 |
|----|----|----|----|----|----|----|----|----|----|----|----|
| C1 | C2 | C3 | C4 | C1 | C2 | C3 | C4 | C1 | C2 | C3 | C4 |
| B1 | B2 | B3 | B4 | B1 | B2 | B3 | B4 | B1 | B2 | B3 | B4 |
| A1 | A2 | A3 | A4 | A1 | A2 | A3 | A4 | A1 | A2 | A3 | A4 |
| D1 | D2 | D3 | D4 | D1 | D2 | D3 | D4 | D1 | D2 | D3 | D4 |
| C1 | C2 | C3 | C4 | C1 | C2 | C3 | C4 | C1 | C2 | C3 | C4 |
| B1 | B2 | B3 | B4 | B1 | B2 | B3 | B4 | B1 | B2 | B3 | B4 |
| A1 | A2 | A3 | A4 | A1 | A2 | A3 | A4 | A1 | A2 | A3 | A4 |
| D1 | D2 | D3 | D4 | D1 | D2 | D3 | D4 | D1 | D2 | D3 | D4 |
| C1 | C2 | C3 | C4 | C1 | C2 | C3 | C4 | C1 | C2 | C3 | C4 |
| B1 | B2 | B3 | B4 | B1 | B2 | B3 | B4 | B1 | B2 | B3 | B4 |
| A1 | A2 | A3 | A4 | A1 | A2 | A3 | A4 | A1 | A2 | A3 | A4 |

31

| m2 | m1 | m4 | m3 |
| --- | --- | --- | --- |
| m4 | m3 | m2 | m1 |
| m3 | m4 | m1 | m2 |
| m1 | m2 | m3 | m4 |

0.5σ

IMAGE SENSOR AND ELECTRONIC DEVICE

TECHNICAL FIELD

The present disclosure relates to an image sensor, an electronic device, and a method for generating a tessellation tile, and more particularly, to an image sensor, an electronic device, and a method for generating a tessellation tile capable of reducing noise caused by an internal structure of an image sensor, more specifically, pixel arrangement produced by analog digital converters (ADCs).

BACKGROUND ART

Noise that can be generated in pixel signals output from a CMOS image sensor is classified as noise generated independently in a pixel or pattern noise caused by an internal structure an image sensor. Examples of known pattern noise include vertical stripe noise, horizontal stripe noise, and block noise.

A CMOS image sensor (hereinafter also referred to as a CIS) is provided with ADCs for converting a charge signal read from each pixel into a digital pixel signal. In a case of column ADCs widely used in CMOS image sensors, for example, a structure in which ADCs, each of the ADCs handling a column of pixels arranged vertically among a large number of pixels contraposed vertically and horizontally, are arranged in parallel and in which charge signals are simultaneously read from a line of pixels arranged horizontally and converted from analog to digital is typical. Reading of pixel lines is conducted sequentially by scanning the lines upward from the bottom (or downward from the top), so that a frame of pixels is read.

Stemming from such provision of ADCs for respective columns, however, vertical stripe noise or horizontal stripe noise may appear to be generated in a fixed or random manner on an image output from the CIS.

In general, human eyes are known to have high stripe (line) detection capability and perceive vertical stripe noise or horizontal stripe noise unless the noise is ⅒ or less of noise present independently in each pixel. In the field of CIS development, attempts are currently being made to reduce noise in each pixel to the limit so as to improve image quality, and it is thus difficult to further reduce such horizontal stripe noise and vertical stripe noise by one more order of magnitude than the noise in each pixel.

A specific example of the horizontal stripe noise will now be presented. FIG. 1 illustrates pixel noise intentionally generated by a computer program, in such a manner that independent Gaussian noise (random noise) of 1.0 σ is added to each of 100×100 pixels and Gaussian noise of 0.3 σ common in the line direction (horizontal direction) is further added. In other words, a state in which horizontal stripe noise that is 0.3 times the noise in each pixel is added is obtained.

Note that σ is a unit with a standard deviation of 1/12 when gray levels are expressed by numerical values of 0 (black) to 1 (white). FIG. 1 corresponds to a state in which a gray level of 0.5 is assigned to an average image and noise of 0.5±6 σ can be expressed. The unit σ is also used in the following description.

Vertical stripes among pattern noise are caused by individual variation of ADCs provided for respective columns, more specifically, by failure to completely eliminate offset differences, gain errors, non-linearity, differences in setting time, and the like. Although suppression of vertical stripe noise is basically achieved through correlated double sampling (CDS) on each column, noise left uncancelled is perceived as vertical stripes.

Horizontal stripes among pattern noise are caused by fluctuation of noise added in common to a column due to differences in reading time among lines. Examples of noise source causing horizontal stripes include noise contained in a ramp signal and fluctuations in power supply or bias. For suppression of horizontal stripe noise, a method of adjusting the black levels of respective lines to the same level by using an optical black portion provided in a periphery of a pixel area (refer, for example, to Patent Document 1).

Most of measures against noise including the aforementioned measures have been dealing with noise sources. However, from the viewpoint that such measures dealing with noise sources have already reached a limit, measures to make noise less visible are also proposed. For example, Patent Document 2 proposes a method of randomly replacing an ADC for a column with another at every line.

CITATION LIST

Patent Documents

Patent Document 1: Japanese Patent Application Laid-Open No. 2012-15587
Patent Document 2: Japanese Patent Application Laid-Open No. 2011-91535

SUMMARY OF THE INVENTION

Problems to be Solved by the Invention

Furthermore, image sensors including area ADCs, each of the ADCs being provided for a predetermined area (a square or rectangular area, for example) among a large number of pixels arranged vertically and horizontally, have recently been developed.

In a case of an image sensor in which area ADCs are employed, since pattern noise (specifically, block noise corresponding to a pixel area handled by one ADC) caused by the structure of the image sensor can also be generated similarly to an image sensor in which column ADCs are employed, measures against such noise are needed.

The present disclosure is made in view of these circumstances, and allows pattern noise that can be generated in an image output from an image sensor including column ADCs or area ADCs to be less visible.

Solutions to Problems

An image sensor that is a first aspect of the present disclosure is an image sensor including ADCs, each of the ADCs being provided for a column, wherein the ADCs associated with the respective columns are configured to read charge signals simultaneously from pixels arranged on lines different from one another of the respectively associated columns, the number of ADCs being a predetermined number corresponding to the number of columns, the columns being adjacent to one another.

The predetermined number of ADCs associated with the predetermined number of columns adjacent to one another can read charge signals simultaneously from pixels being arranged on lines of the respectively associated columns, each of the pixels being on a line shifted by one line from that on adjacent one column.

The ADC associated with any one of the columns can read a charge signal also from a pixel placed on a column other than the associated column.

The ADC associated with any one of the columns can read charge signals continuously from a plurality of pixels arranged on lines, different from one another, of a plurality of columns.

The ADC associated with any one of the columns can read charge signals continuously from a plurality of pixels arranged on lines, each of the pixels being on a line shifted by one line from that on adjacent one column.

An electronic device that is a second aspect of the present disclosure is an electronic device including an image sensor, wherein the image sensor includes ADCs, each of the ADCs being provided for a column, and the ADCs associated with the respective columns are configured to read charge signals simultaneously from pixels arranged on lines different from one another of the respectively associated columns, the number of ADCs being a predetermined number corresponding to the number of columns, the columns being adjacent to one another.

An image sensor that is a third aspect of the present disclosure is an image sensor including ADCs, each of the ADCs being provided for an area constituted by a plurality of pixels, wherein arrangement of pixels from which charge signals are to be read by one of the ADCs is in a form of a tessellation tile translated to cover a screen in such a manner that pixels on same coordinates do not overlap with each other.

The tessellation tile can be translated to cover the screen entirely except a periphery of the screen in such a manner that pixels on same coordinates do not overlap with each other.

An electronic device that is a fourth aspect of the present disclosure is an electronic device including an image sensor, wherein the image sensor includes ADCs, each of the ADCs being provided for an area constituted by a plurality of pixels, and arrangement of pixels from which charge signals are to be read by one of the ADCs is in a form of a tessellation tile translated to cover a screen in such a manner that pixels on same coordinates do not overlap with each other.

A method for generating a tessellation tile, which is a fifth aspect of the present disclosure, is a method for generating a tessellation tile, the tessellation tile representing arrangement of pixels handled by an area analog digital converter (ADC), the method including: a first attaching step of attaching indices to n×n pixels constituting an original ADC area by an information processing device; a second attaching step of attaching the same indices as those of the original ADC area to pixels in a neighboring ADC area obtained by translating the original ADC area; and a moving step of moving a given number of pixels in the original ADC area to positions of pixels to which the same indices are assigned in the neighboring ADC area.

In the fifth aspect of the present disclosure, indices are attached to n×n pixels constituting an original ADC area; the same indices as those of the original ADC area are attached to pixels in a neighboring ADC area obtained by translating the original ADC area; and a given number of pixels in the original ADC area are moved to positions of pixels to which the same indices are assigned in the neighboring ADC area.

Effects of the Invention

According to the first to fourth aspects of the present disclosure, boundaries of pattern noise that can be generated in an image can be blurred.

According to the fifth aspect of the present disclosure, a tessellation tile that can be employed for area ADCs can be generated.

BRIEF DESCRIPTION OF DRAWINGS

FIG. 6 is a diagram illustrating an example of a texture for dealing with horizontal stripe noise and vertical stripe noise.

FIG. 7 is a diagram illustrating an example of a texture for dealing with horizontal stripe noise and vertical stripe noise.

FIG. 8 is a diagram illustrating an example of a texture for dealing with horizontal stripe noise and vertical stripe noise.

FIG. 10 is a diagram for explaining the meaning of translation.

FIG. 11 is a diagram illustrating a tessellation tile (windmill-shaped tessellation tile) of one-pixel leakage.

MODE FOR CARRYING OUT THE INVENTION

Preferred mode (hereinafter referred to as an embodiment) for carrying out the present disclosure will be described in detail below with reference to the drawings; however, an outline of the embodiment of the present disclosure will be described before going into the details.

<Outline of Embodiment of Present Disclosure>

In the embodiment of the present disclosure, the order in which pixels are read by column ADCs is changed or arrangement of pixels handled by each of area ADCs is contrived so that pattern noise, which can be generated in an image output from an image sensor in which the column ADCs or the area ADCs are employed, caused by arrangement of pixels handled by each of the ADCs will become less visible. Specifically, pattern noise is made less noticeable by arranging pixels into a shape that is hard for a human to immediately recognize instead of changing the order in which pixels are read by the column ADCs from the units of lines or instead of making arrangement of pixels handled by each of the area ADCs in units of squares or rectangles. This can be expected to produce effects of reducing noise in units of pixels close to the limit and further making pattern noise unnoticeable when a human sees the image. The embodiment can be mounted on any electronic device.

<Application of Present Disclosure to Column ADCs>

Figure 2:
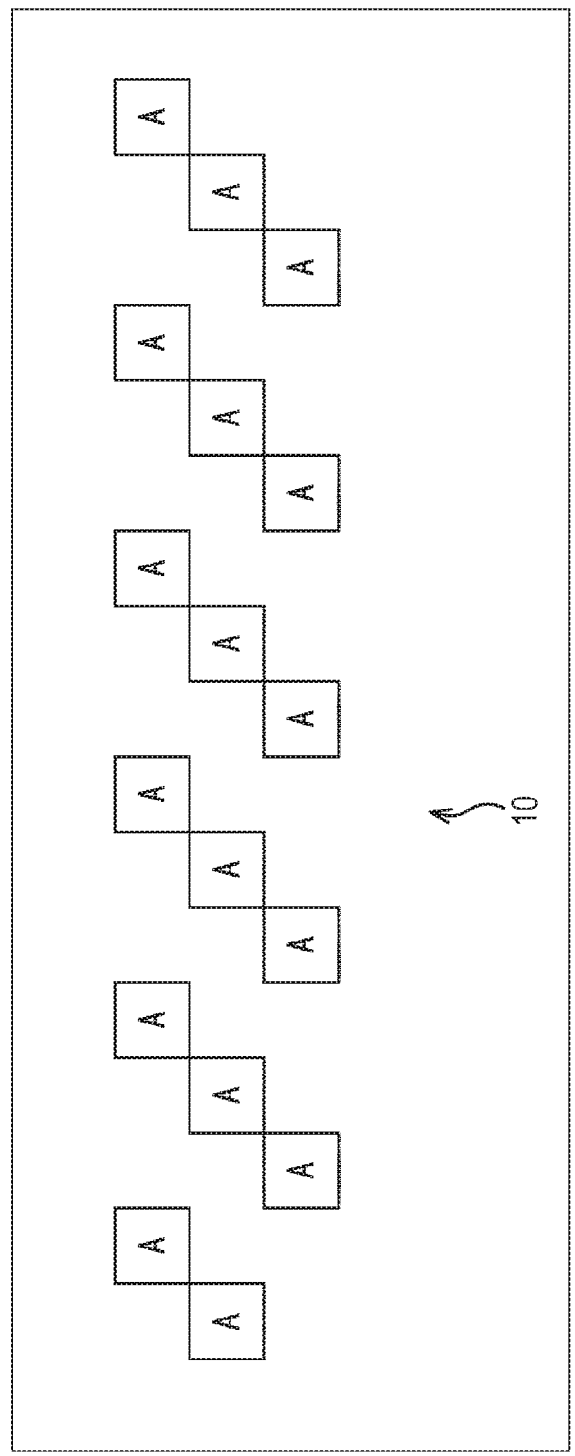
FIG. 2 is a diagram illustrating a saw texture representing arrangement of pixels read at the same time by column ADCs to which the present disclosure is applied.

FIG. 2 illustrates arrangement of pixels simultaneously read by column ADCs according to the embodiment. In the case of FIG. 2, lines that are bases of processing units are shifted up and down by one pixel in a three-column cycle. The pixel arrangement illustrated in FIG. 2 will hereinafter be referred to as a "saw texture". Note that a texture is used herein as a term referring to a basic shape of pixels that are read at the same time by column ADCs.

Arrangement of a plurality of saw textures 10 illustrated in FIG. 2 clearly covers the entire screen (all the pixels included in the image sensor). Note that the saw texture is not limited to that of a three-column cycle, and may have a longer cycle.

Figure 3:
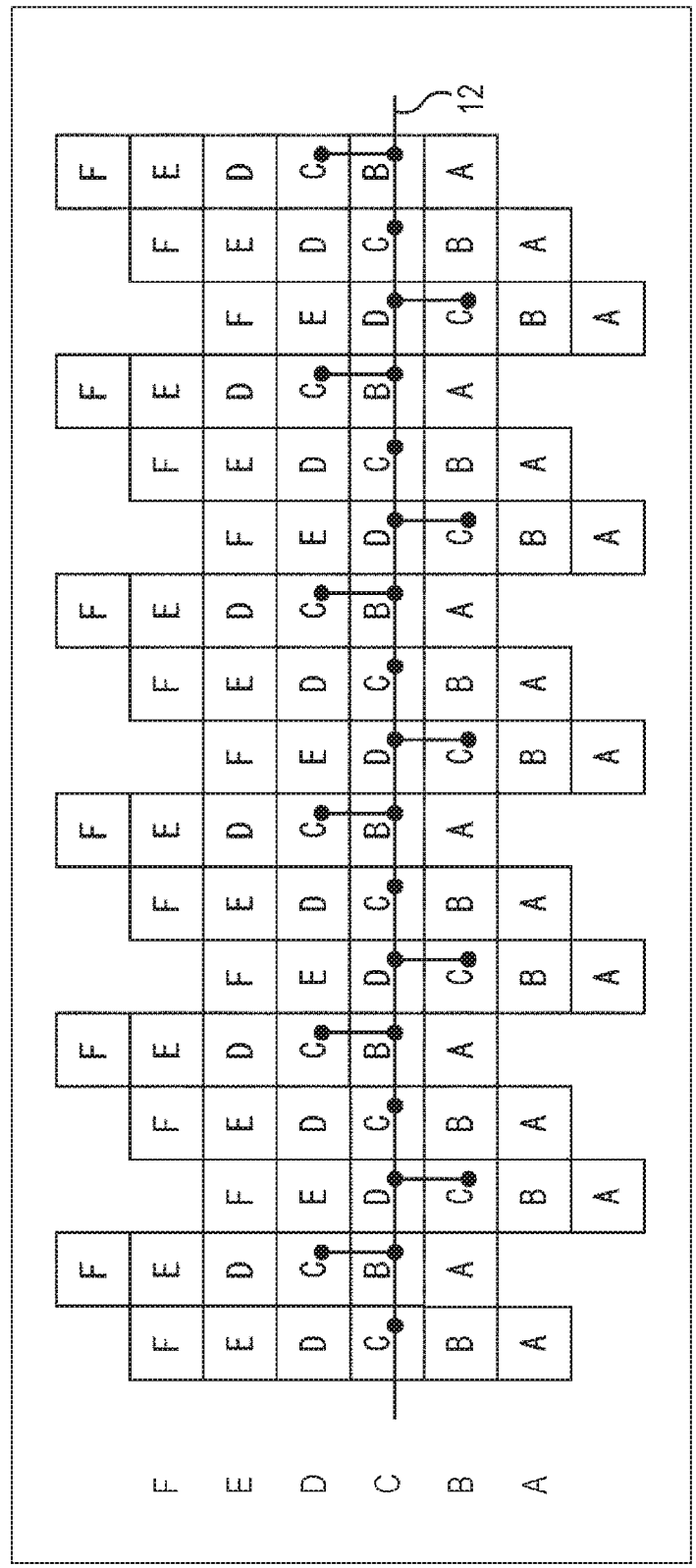
FIG. 3 is a diagram illustrating a state in which saw textures are arranged to form pixels corresponding to six lines.

FIG. 3 shows that arrangement of a plurality of saw textures can form pixels corresponding to six lines, in which letters on the left end represent positions of lines and letters such as A and B written in the pixels indicate that pixels with the same letter are read at the same time.

In FIG. 3, wiring for selection signals focused on line C is shown. The selection signal wiring 12 will select a pixel shifted upward by one pixel or a pixel shifted downward by one pixel on every other column. Note that such wiring results in an increase in the wiring length for driving pixels above and below the line of interest, and whether or not this overhead is acceptable is thus a problem of selection of design. In the case of FIG. 3, since the wiring length is increased by two pixels including the pixels above and below for a distance of three pixels, the parasitic capacitance of the wiring is approximately 5/3 times the distance. If this load increase is severe for the design, the selection line may be divided into three lines. Instead of the reduction in the load per line, however, the wiring in the horizontal direction will be tripled.

Figure 1:
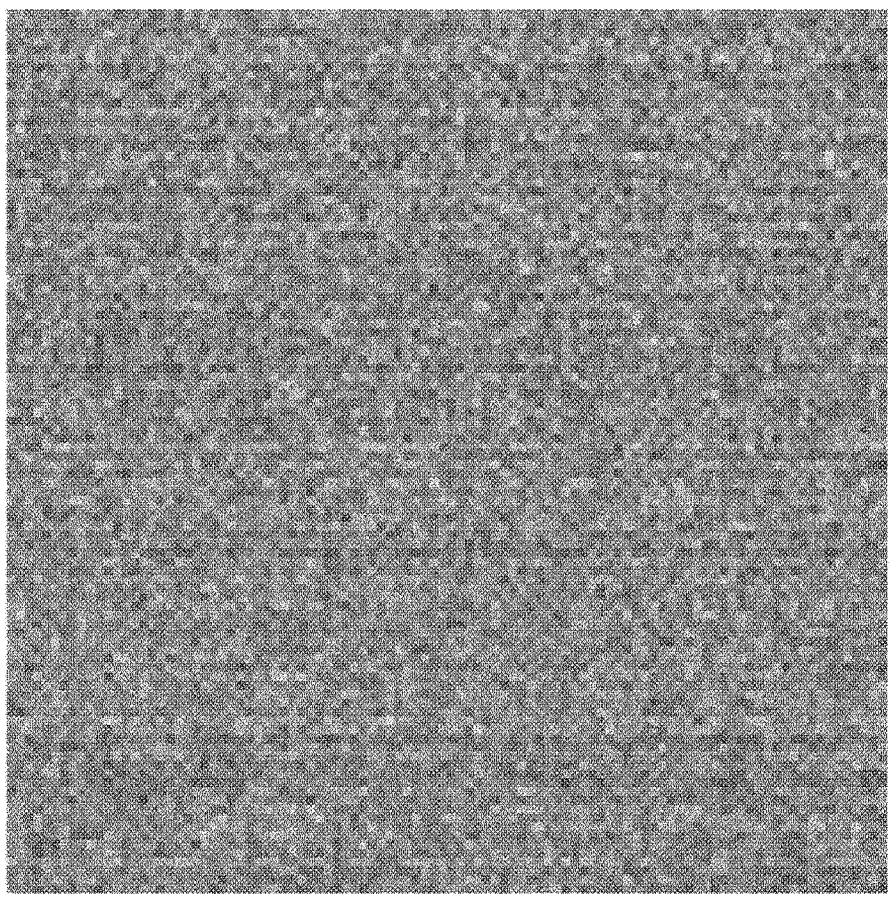
FIG. 1 is a drawing illustrating an example of pixel noise where horizontal stripes are visible.
Figure 4:
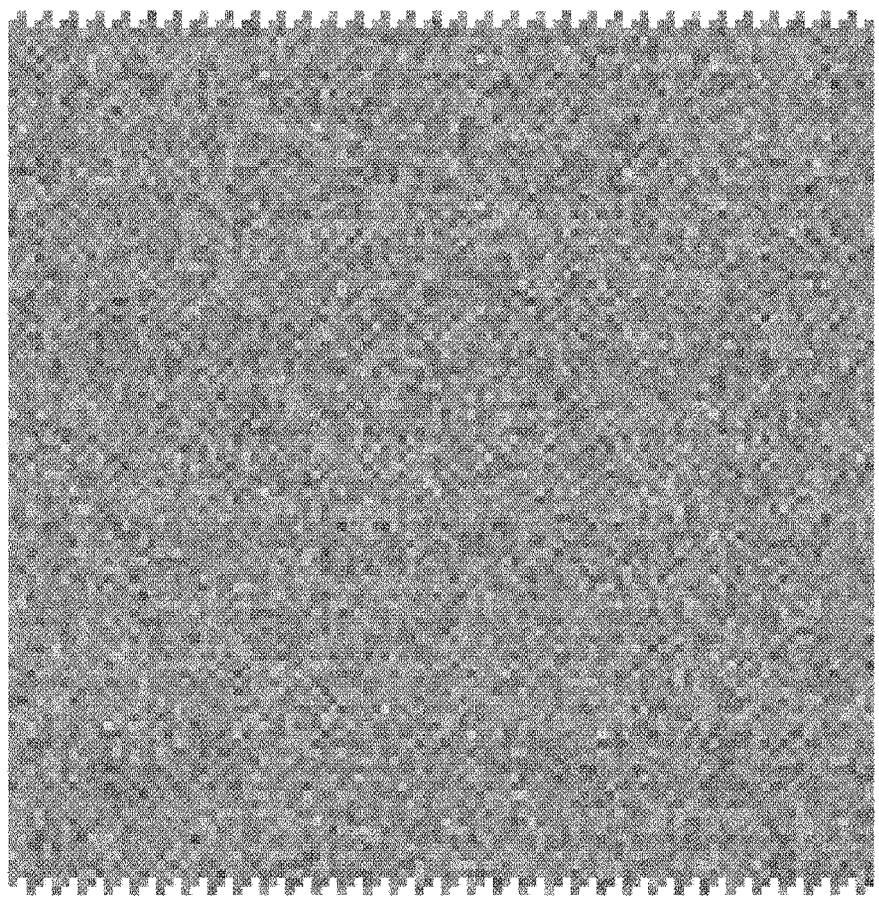
FIG. 4 is a drawing showing noise obtained when the pixel noise of FIG. 1 is read according to the saw textures.

FIG. 4 shows a state in which pixel noise where horizontal stripe noise shown in FIG. 1 is visible has been rearranged with the saw textures illustrated in FIG. 2, or in other words, noise in a case where saw textures are employed in pixel reading performed by column ADCs.

As is apparent from comparison between FIG. 1 and FIG. 4, the horizontal stripe noise perceived in FIG. 1 has become less noticeable in FIG. 4 to such a degree that the horizontal stripe noise is almost invisible. In the case of FIG. 4, although the upper and lower edges of the image are rough reflecting the shape of the saw textures, this does not particularly cause any problem if the upper and lower edges are appropriately processed as invalid pixels or the like. In fact, the edges need not be present as pixel areas; instead, an auxiliary circuit configured to generate an appropriate potential may be provided outside the pixel areas and only such a process as connecting to the auxiliary circuit may be performed when reading the rough edges.

In the saw texture of a size of three lines illustrated in FIG. 2, since pixels that are driven at the same time are present at every three pixels on one line, the standard deviation is compressed to $1/\sqrt{3}$ if noise between lines is independent. Although the standard deviation will be smaller and the pattern noise will be less noticeable if the size of the saw texture is increase, the saw texture of the size of three lines will be sufficient in practice.

Figure 5:
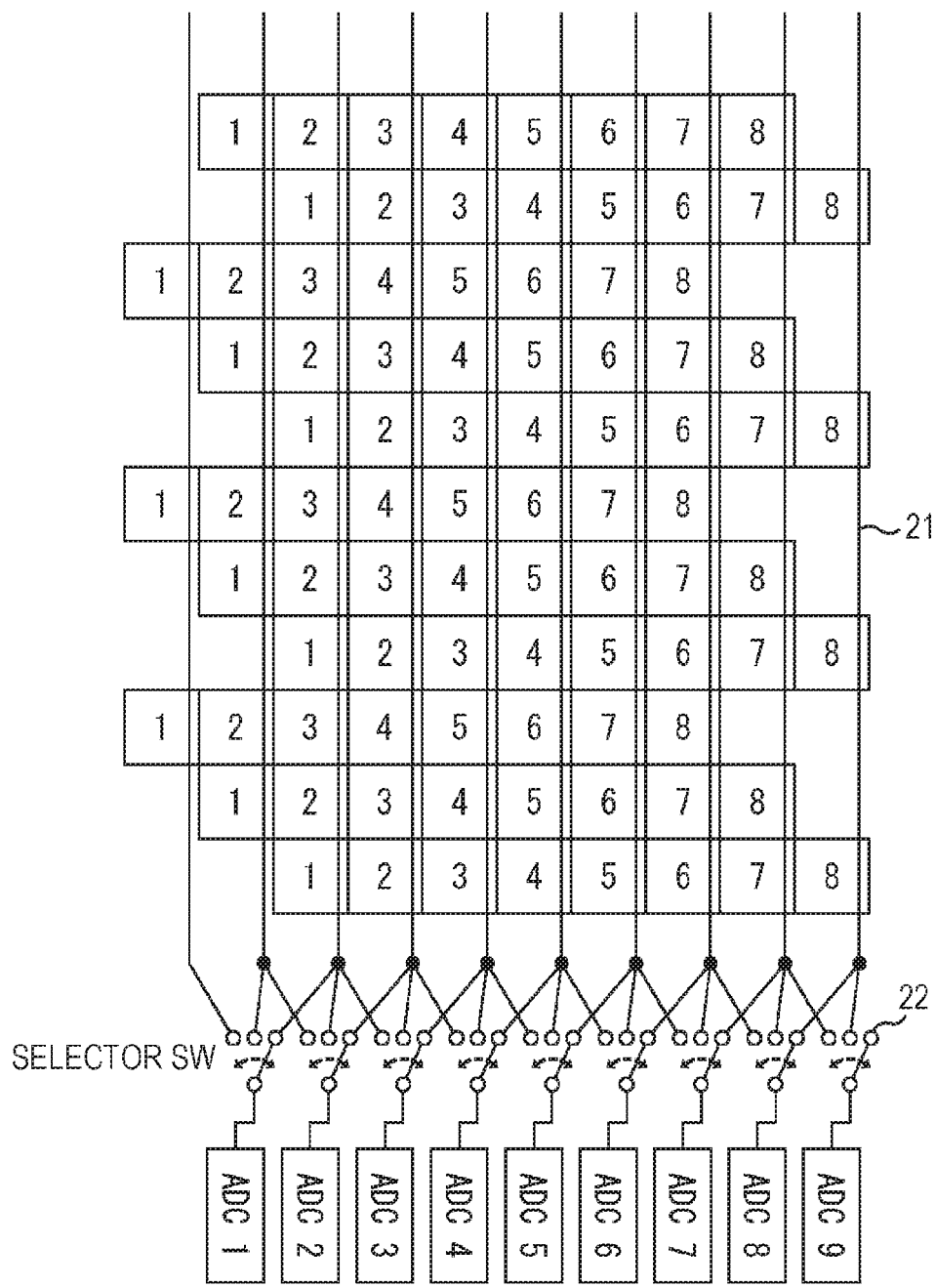
FIG. 5 is a diagram illustrating an example structure of column ADCs for dealing with vertical stripe noise.

Vertical stripe noise can be processed similarly. FIG. 5 illustrates an example structure for making column ADCs process vertical stripe noise. In the example structure of FIG. 5, vertical signal lines (VSL) for reading remain straight along the columns, and selector switches 22 immediately before the receiving ADCs switch among VSLs 21. Note that number written each pixel represents the ADC that reads the pixel. In this example structure, such zigzag wiring as the selection line in the line direction illustrated in FIG. 3 is not necessary. Although areas that cannot be used are produced at left and right edges of the image, actual pixels need not be placed in these areas and connection to an appropriate potential at the time of reading will be sufficient similarly to the rough edges of FIG. 4.

Figure 6:
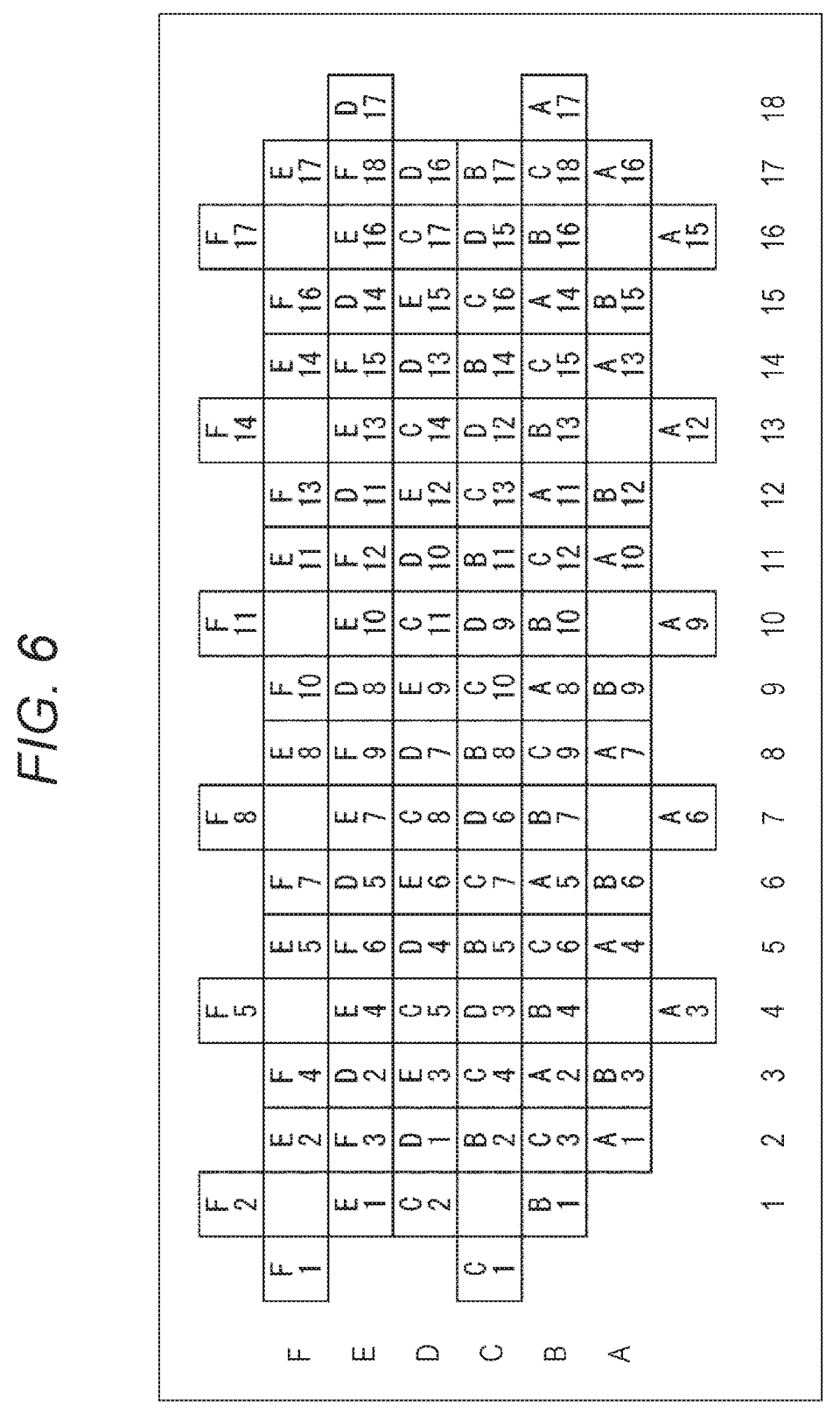
Figure 7:
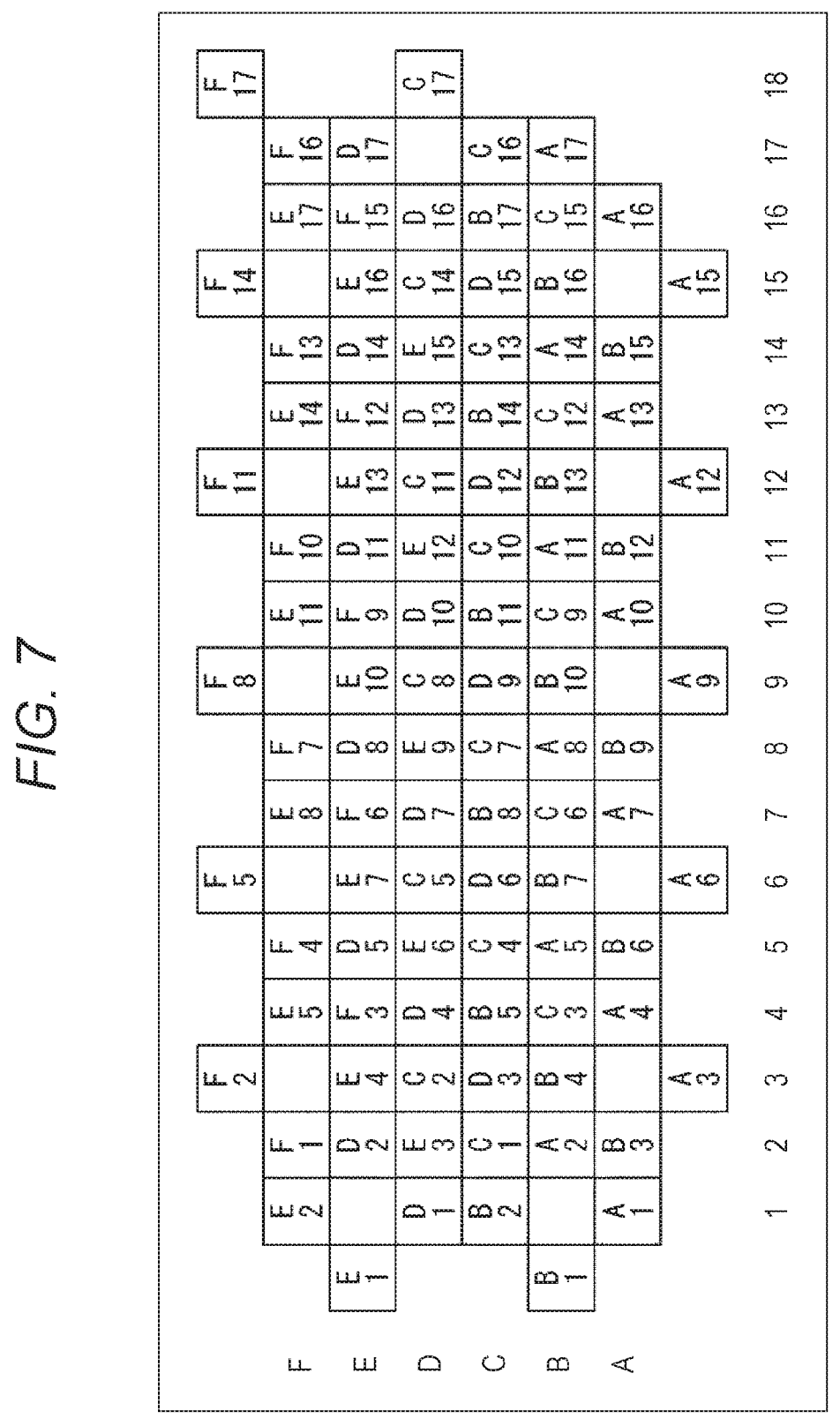
Figure 8:
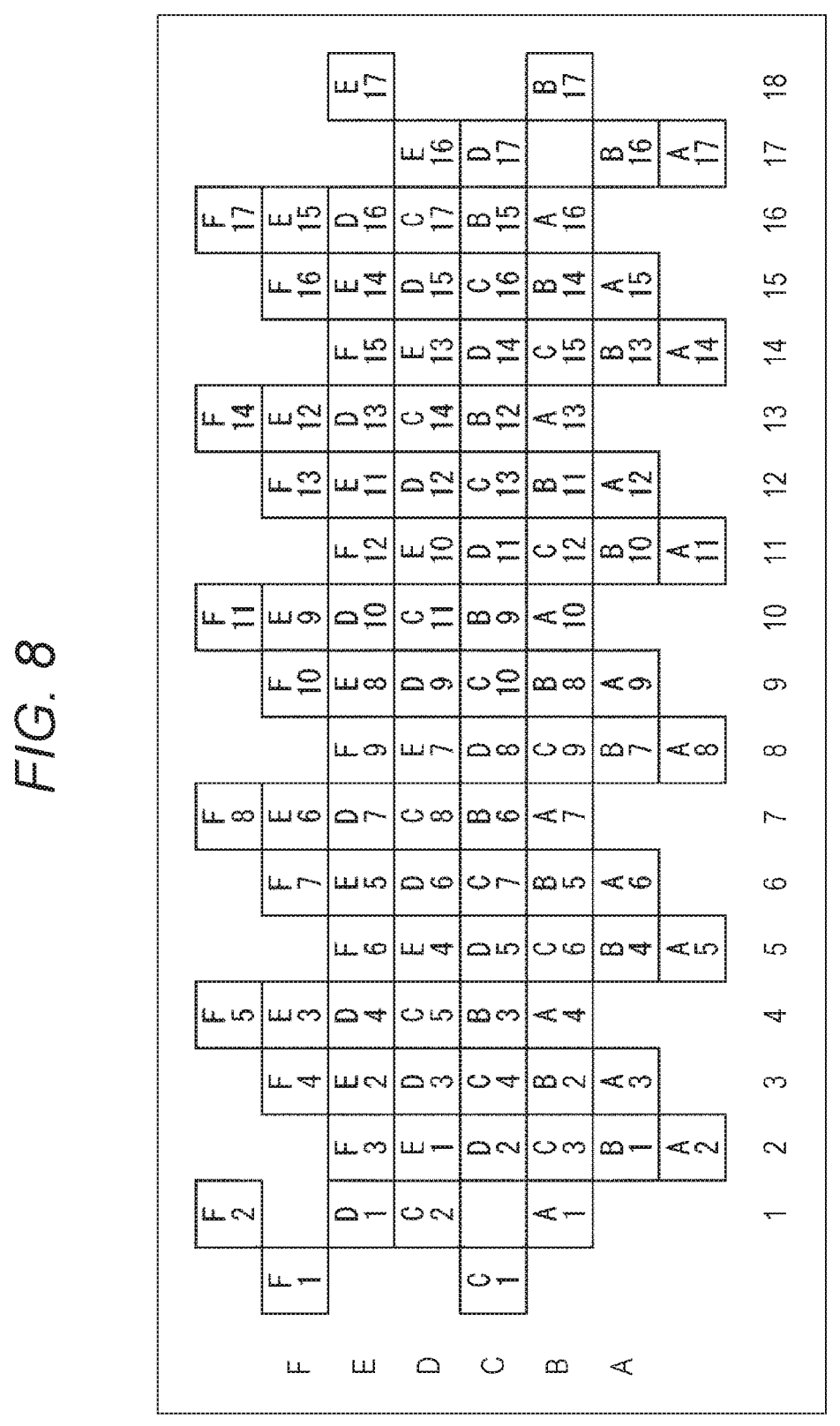

Next, examples of textures for dealing with horizontal stripe noise and vertical stripe noise are shown in FIGS. 6 to 8. A texture of FIG. 6 is obtained by arranging the saw textures of FIG. 2 each with an upper-left shift of one pixel.

In FIGS. 6 to 8, letters on the left end represent positions of lines, and numbers on the bottom end represent positions of columns. In addition, letters written in respective pixels indicate that pixels with the same letter are read at the same time. The number written in each pixel represents the ADC that reads the pixel.

Any of the textures of FIGS. 6 to 8 may be employed, and both of the horizontal stripe noise and the vertical stripe noise can be dealt with without much difference by any of the textures.

<Application of Present Disclosure to Area ADCs>

Next, a case in which the present disclosure is applied to area ADCs will be described.

In the case of area ADCs, what stands out as pattern noise is block noise corresponding to an area of pixels handled by each ADC and caused by differences in offset among the ADCs.

Figure 9:
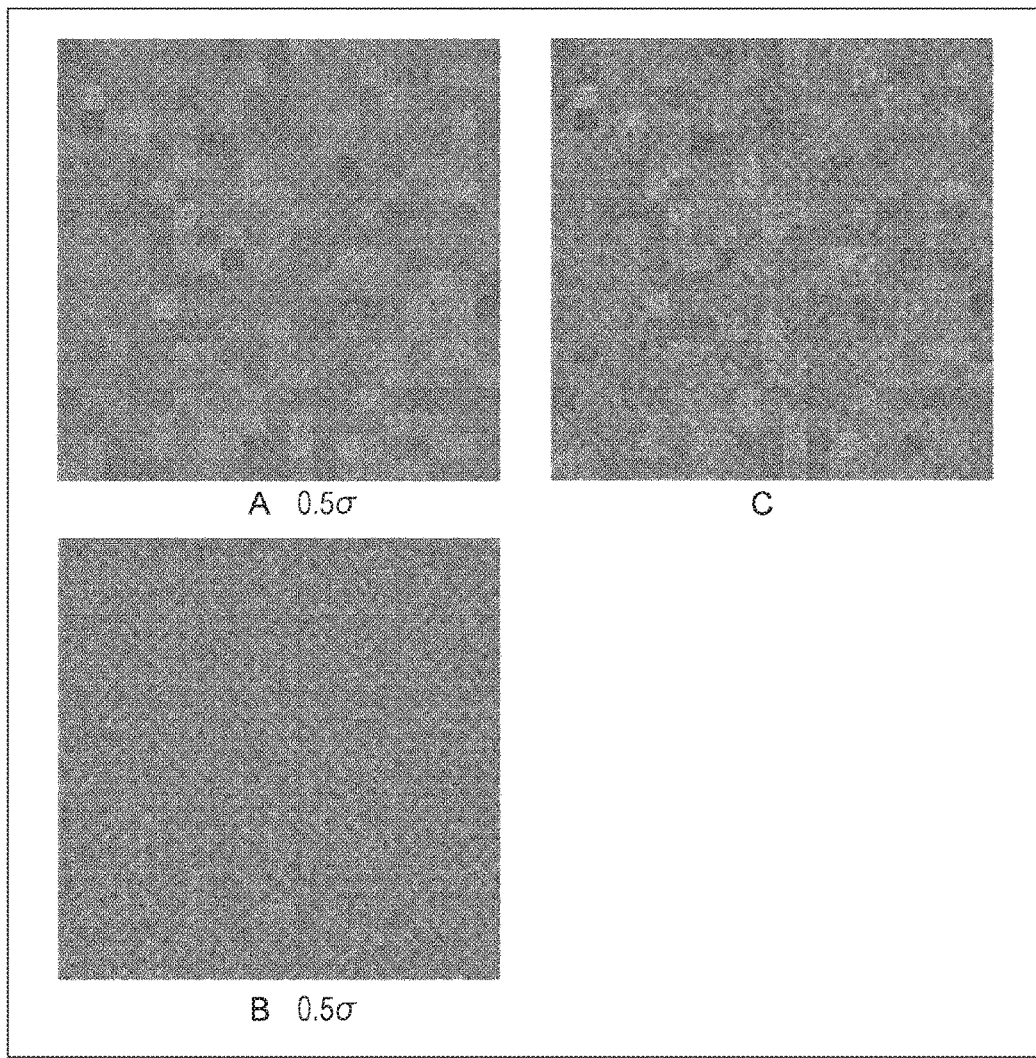
FIG. 9 is a drawing showing specific examples of block noise.

FIG. 9 shows samples of block noise. Note that FIG. 9A shows differences in offset among areas in grayscale where one area is a square of 4×4 pixels and each of the areas has an offset according to Gaussian distribution with 0.5 σ. FIG. 9B is obtained by adding independent Gaussian noise (random noise) of 0.5 σ to each of 100×100 pixels. FIG. 9C shows a sample of block noise, which can be generated in an image output from an image sensor including area ADCs of the related art, the block noise being obtained by adding the Gaussian noise of each of the pixels shown in FIG. 9B to the block noise shown in FIG. 9A.

As is apparent from FIG. 9C, boundaries of areas each constituted by a plurality of pixels handled by one ADC can be perceived as block noise. Thus, in order to make the block noise less noticeable, the shape of areas may be changed from squares or rectangles of the related art so that the boundaries of the areas are intricate, arrangement of the areas can cover all the pixels, and no pixel belonging to a plurality of areas will exist.

Since there obviously can be infinite number of area shapes that meet the aforementioned conditions, a reasonable assumption is added so that a shape of areas that can be actually employed can be proposed.

<Assumption for Determining Area Shape>

First, areas associated with the respective ADCs are assumed to be arranged at positions of integral multiples of the vertical and horizontal area sizes on orthogonal coordinates expressing pixel positions. This assumption excludes such an area arrangement in which areas are gradually shifted with respect to adjacent areas, for example.

Relative positions of pixels handled by each area are assumed to be common in all of the areas. In other words, a single type of area shape is employed in one image sensor, and areas of different shapes are not present in a single image sensor. As an exception to this assumption, however, a plurality of areas having different shapes that are complementary with those of adjacent areas can be employed (details of which will be described later).

Wires from the respective pixels to the ADCs that handle the pixels are made not to be tangled, that is, the ADCs are not to handle faraway pixels.

Since the shape of the areas is changed, the shape (typically a square or a rectangle) that an ADC handles as viewed from vertical and horizontal pitches where the ADCs are arranged and the arrangement of pixels (which is heretofore referred to as an area) will not be identical. Since terms for distinguish the former from the latter are required, the former will hereinafter be referred to as an ADC area while the latter will be referred to as a tile. Note that an ADC area does not necessarily have the same shape as the ADC itself. For example, a configuration in which two elongated ADCs handle two square or rectangular ADC areas may be considered.

Operation of shifting one ADC area upward and downward by the vertical size of the ADC area and operation of shifting the ADC area leftward and rightward by the horizontal size of the ADC area are repeated, so that the entire screen can be covered. This shifting will be referred to as translation herein.

FIG. 10 is a diagram for explaining the meaning of "translation". FIG. 10 illustrates nine ADC areas each including 4×4 pixels. One of letters A to D are attached vertically and one of numbers 1 to 4 are attached horizontally as indices to each of 16 pixels constituting one ADC area.

It can be seen that, when the ADC area at the center of FIG. 10 is translated, the pixels move to positions to which the same indices are attached. Furthermore, since combination of horizontal translation and vertical translation can move an ADC area in an oblique direction, it is clear that the entire screen can be covered (filled) with ADC areas resulting from repeating the translation. Note that the indices attached to the respective ADC areas resulting from translation do not change.

Here, replacement of a pixel included in one ADC area with a pixel, to which the same index is attached, in an adjacent ADC area is considered.

FIG. 11 shows replacement of pixels C1, A2, B4, and D3 on the borders in the ADC area at the center with pixels having the same indices in ADC areas adjacent to the respective borders, resulting in a tile shape as shown by hatching in FIG. 11. This tile shape extends beyond the original ADC area by one pixel, such a state of the tile shape will be referred to as one-pixel leakage.

Since the tile illustrated in FIG. 11 extends over a plurality of ADC areas but includes the whole 16 pixels to which indices of A1 to D4 are attached with no lack or excess, the entire screen can be covered by the tiles resulting from repeated translation in such a manner that no pixels overlap the same position. Although an area that is not covered may appear in the periphery of the screen, such an area may be dealt as invalid. In such an area as well, actual pixels need not be placed and connection to an appropriate potential at the time of reading will be sufficient.

A tile having such a property of being capable of covering the entire screen with no lack or excess as a result of repeating the translation will hereinafter be referred to as a tessellation tile.

The tessellation tile 31 shown in FIG. 11 will hereinafter be referred to as a windmill-shaped tessellation tile based on the shape thereof.

<Method for Generating Tessellation Tile>

Figure 12:
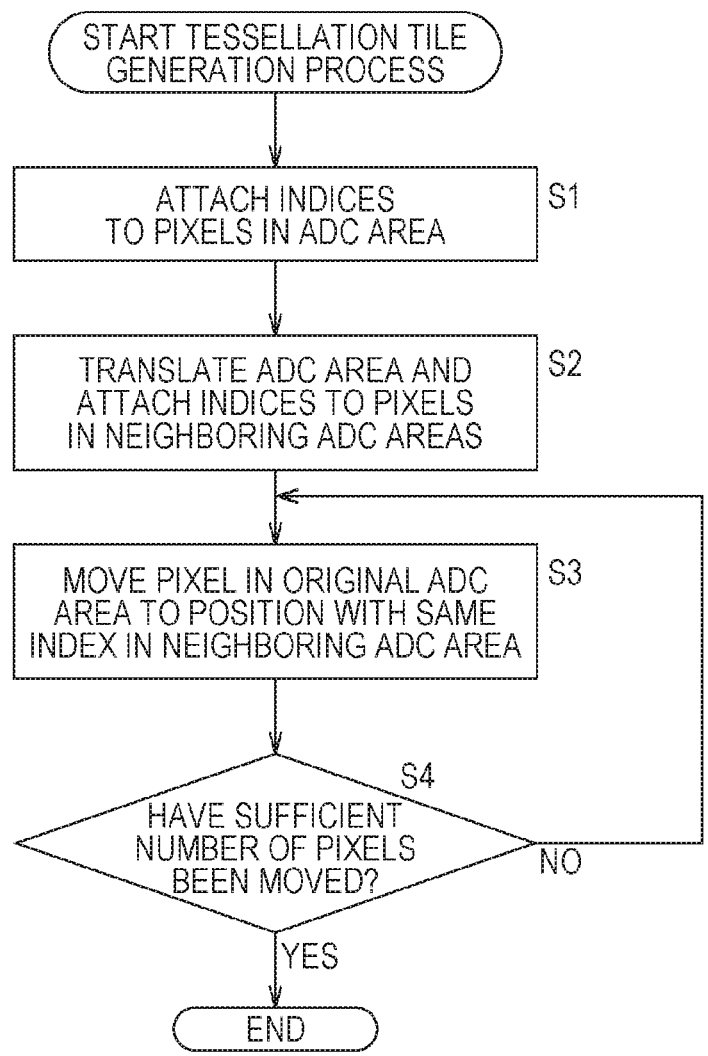
FIG. 12 is a flowchart for explaining a tessellation tile generation process.

A typical method for generating a tessellation tile will be described here. FIG. 12 is a flowchart explaining a tessellation tile generation process performed by an information processing device including a computer and other components.

In step S1, different indices are attached to all of pixels constituting one ADC area as illustrated in FIG. 10. In step S2, this ADC area is translated, so that a plurality of neighboring ADC areas are set near the original ADC area, and the same indices as those of the pixels in the original ADC area are attached to the pixels included in each of the neighboring ADC areas. The neighboring ADC areas may be adjacent to the original ADC area or may be away from the original ADC area by some areas.

In step S3, a pixel to be moved is selected from the pixels in the original ADC area, and the selected pixel is moved to a position of a pixel, to which the same index as that of the selected pixel is attached, in a neighboring ADC area.

In step S4, it is determined whether or not the number of pixels to be moved from the original ADC area is sufficient, and steps S3 and S4 are repeated until it is determined that the number of pixels is sufficient. For this determination, the number of pixels to be moved may be preset by an operator of a computer or may be set on the basis of the number of pixels included in an ADC area. If the number of pixels is determined to be sufficient in step S4, the tessellation tile generation process is then terminated. According to the tessellation tile generation process described above, a tessellation tile can be easily generated.

Note that the neighboring ADC areas set as a result of translation of the original ADC areas are not limited to those adjacent to the original ADC area but may include those away from the original ADC area.

Figure 13:
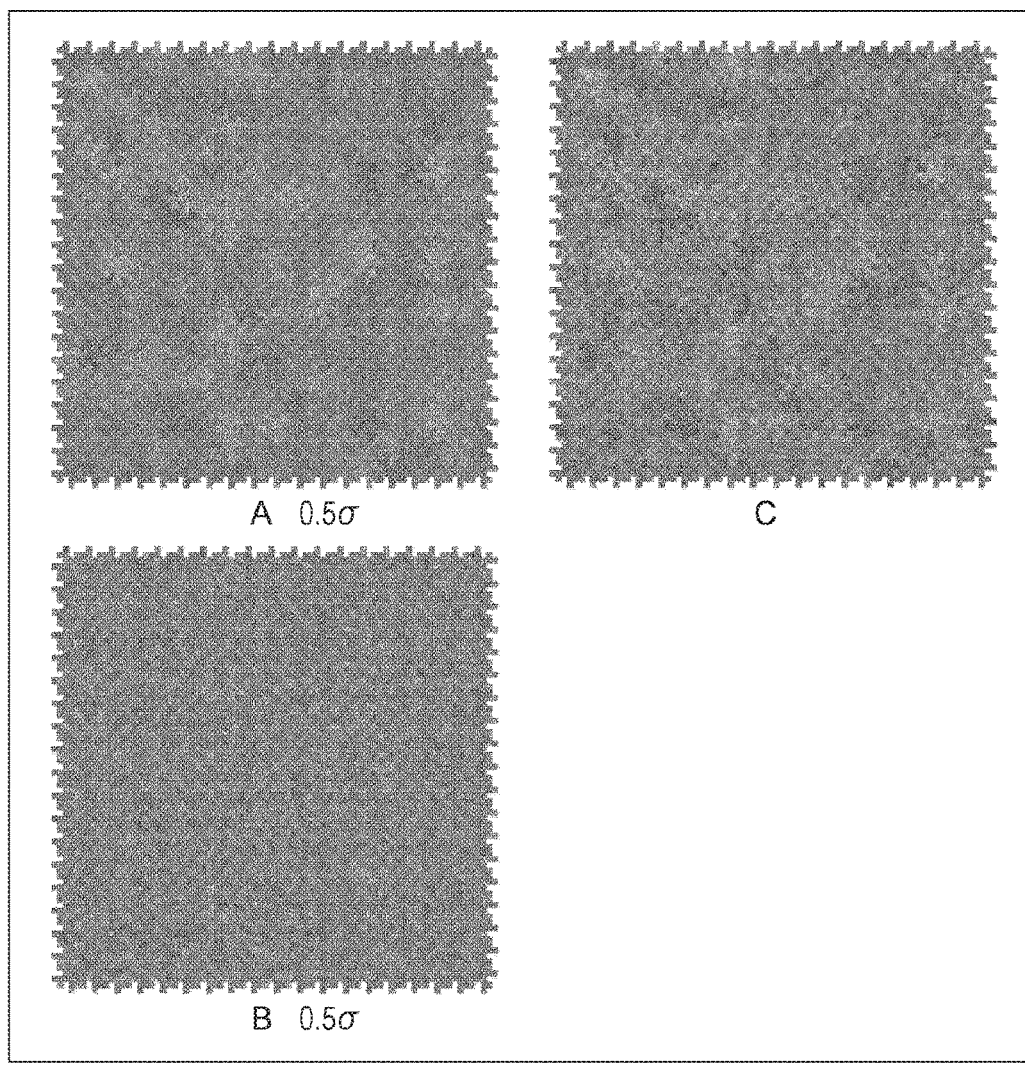
FIG. 13 is a drawing showing pattern noise when the windmill-shaped tessellation tile is employed.

Next, FIG. 13 shows samples of pattern noise when the windmill-shaped tessellation tile of FIG. 11 is employed. FIG. 13A shows differences in offset among windmill-shaped tessellation tiles in grayscale where the windmill-shaped tessellation tiles are arranged over the entire screen and each of the windmill-shaped tessellation tiles has an offset according to Gaussian distribution with 0.5 σ. FIG. 13B is obtained by adding independent Gaussian noise (random noise) of 0.5 σ to each of 100×100 pixels. FIG. 13C shows a sample of pattern noise obtained by adding the Gaussian noise of each of the pixels shown in FIG. 13B to the windmill-shaped pattern noise shown in FIG. 13A in a case where the windmill-shaped tessellation tile is employed.

In FIG. 13C, it can be deemed that the boundaries of the windmill shape can be blurred to such an extent that windmill-shaped pattern noise cannot be immediately perceived. Thus, when an ADC area is constituted by 4×4 pixels, a sufficient boundary blurring effect can be expected even with one-pixel leakage as in the case of the windmill-shaped tessellation tile shown in FIG. 11.

Figure 14:
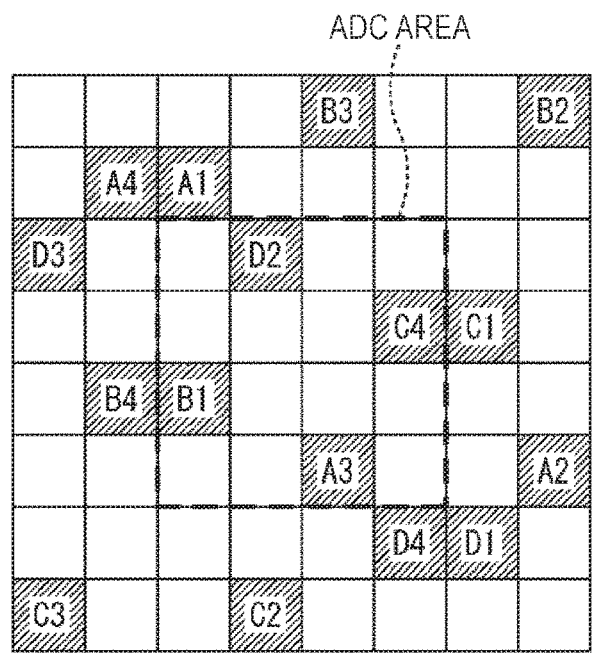
FIG. 14 is a diagram illustrating an example of a tessellation tile with two-pixel leakage.

Next, FIG. 14 shows an example of a tessellation tile with two-pixel leakage when an ADC area is constituted by 4×4 pixels. This tessellation tile can also be generated by the tessellation tile generation process described above. The tessellation tile is characterized in that the number of pixels on each line and the number of pixels on each column are equal (two pixels in the case of FIG. 14). As a result of uniformly distributing pixels handled by one ADC as in this tessellation tile, it can be expected that the shape of the tessellation tile will become less noticeable because of the characteristics of human eyes.

<Method for Generating Tessellation Tile Corresponding to an ADC Constituted by n×n Pixels>

While an ADC area of 4×4 pixels has been described heretofore an actual ADC area is assumed to include about 10×10 to 20×20 pixels. When an ADC area is larger in this manner, the pixel leakage also needs to be increased. The tessellation tile generation process described above can also be applied to generation of such a tessellation tile.

In the tessellation tile generation process described above, however, it is difficult to meet such demands as adjusting the density of pixels constituting a tessellation tile so that the density will be well-distributed and making the shape difficult to be recognized by human. Hereinafter, a method for generating a tessellation tile, which can meet such demands, will be described.

For simplicity, a case in which an ADC area is assumed to be a square of n×n pixels and the same pixel leakage is used for all of upward, downward, leftward, and rightward directions will be described. Note that the following description can also be applied to a case in which an ADC area is a rectangle with different numbers of vertical pixels and horizontal pixels.

Figure 15:
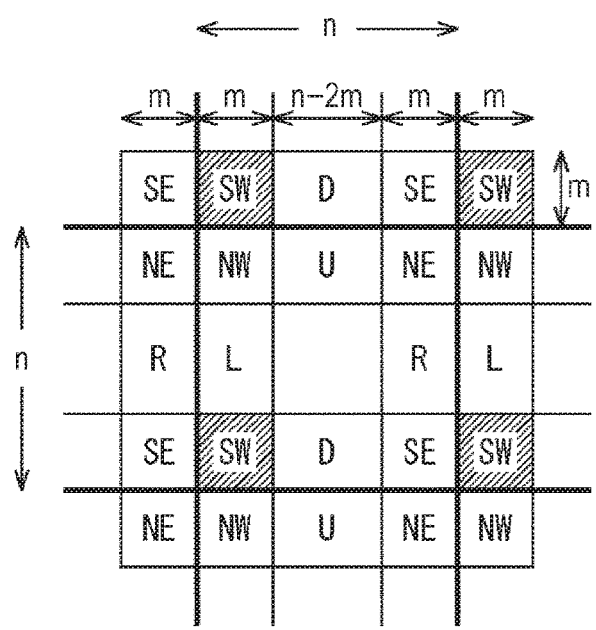
FIG. 15 is a diagram for explaining a method for generating a tessellation tile corresponding to an ADC area of n×n pixels.

FIG. 15 shows a state of overlap of pixel leakage regions from the ADC area of n×n pixels. Since m pixels leak into the ADC area of n×n pixels from each of adjacent ADC areas, the original ADC area is assumed to be divided into nine regions (to be precise, if n=2m, the original ADC area is divided into four regions; the following description can also be applied to such a case).

First, indices are attached to the nine regions into which the original ADC area is divided. Specifically, an index of NW is attached to a corner region to the upper-left of the middle region, an index of U is attached to an intermediate region above the middle region, an index of NE is attached to a corner region to the upper-right of the middle region, an index of L is attached to an intermediate region to the left of the middle region, an index of R is attached to an intermediate region to the right of the middle region, an index of SW is attached to a corner region to the lower-left of the middle region, an index of D is attached to an intermediate region below the middle region, and an index of SE is attached to a corner region to the lower-right of the middle region.

According to the leakage regions of the original ADC area, it can be seen that each of the corner regions NW, NE, SW, and SE has four corresponding regions to be handled including itself. When focus is placed on the SW regions, it can be seen that the corresponding regions occupy the positions each being outside of one of four corners by one region. The other corner regions are similarly located. Thus, the average filling rate (the rate of pixel handling) of the corner regions is 1/4.

In contrast, it can be seen that each the intermediate regions U, L, R, and D has two leakage regions to be handled in total. Thus, the average filling rate of the intermediate regions is 1/2.

Here, orthogonal tiles to be referred to in the following description will be defined. Orthogonal tiles are a set (hereinafter referred to as a system) of tiles each obtained by selecting some of pixels constituting a region corresponding to that of another tile in the set, the set of tiles being a group of tiles in which no pixel overlap between any two tiles of the group. Note that the tiles being referred to are part of a tessellation tile, or what can be called "partial tiles", but will still be referred to as tiles since there seems to be little concern for confusion with tessellation tiles.

Furthermore, a state in which an original area can be covered perfectly with all of the tiles belonging to a system will be referred to as "complete". In other words, generation of a tessellation tile is generation of a complete orthogonal system for each leakage region.

Figure 16:
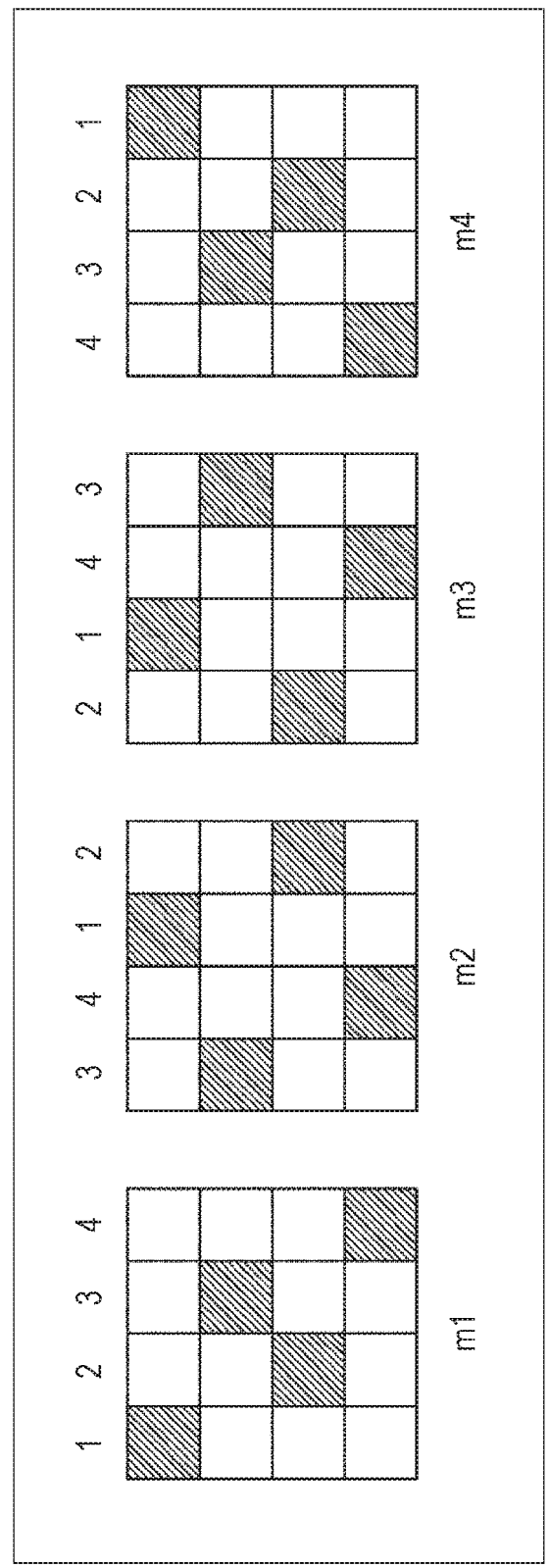
FIG. 16 is a diagram showing examples of uniform, complete orthogonal system tiles of 4×4 pixels.

FIG. 16 shows an example of a complete orthogonal system (uniform, complete orthogonal system) constituted by tiles having the same number of pixels and corresponding to an ADC area of 4×4 pixels. Note that the numbers of pixels contained in the tiles constituting a complete orthogonal system need not be the same number.

It can be directly confirmed that any two of tiles m1, m2, m3, and m4 shown in FIG. 16 are orthogonal to each other, and that the entire square area of 4×4 pixels is covered when the tiles are superimposed.

A feature of the uniform, complete orthogonal system shown in FIG. 16 is that, when focus is placed on each line or each column of the tiles, there is only one pixel to be handled. A problem of obtaining such arrangement in a square area of n×n pixels is known as rooks problem. Since the rook is a chess piece that move similarly to hisha, which is a piece of shogi (Japanese chess), the problem is also called hisha problem.

The hisha problem is known to have different solutions, the number of different solutions being the factorial of n. Specifically, it can be readily seen that the number of solutions is the factorial of n since there are n different arrangements of pixels on the first column, (n−1) different arrangements of pixels on the second column, (n−2) different arrangements of pixels on the third column, . . . , and one arrangement of pixels on the n-th column.

It is clear that shifting of each column in a cyclic manner from a freely-selected solution of an n-hisha problem will also result in a solution of an n-hisha problem, which also entirely constitutes a complete orthogonal system.

For example, focus is placed on the tile m1 of the uniform, complete orthogonal system shown in FIG. 16. When serial numbers of 1 to 4 are assigned to the respective columns of the tile m1 and associated with the positions of the pixels, the other tiles m2 to m4 can be expressed by using the line numbers of the tile m1.

Figures 17, 18:
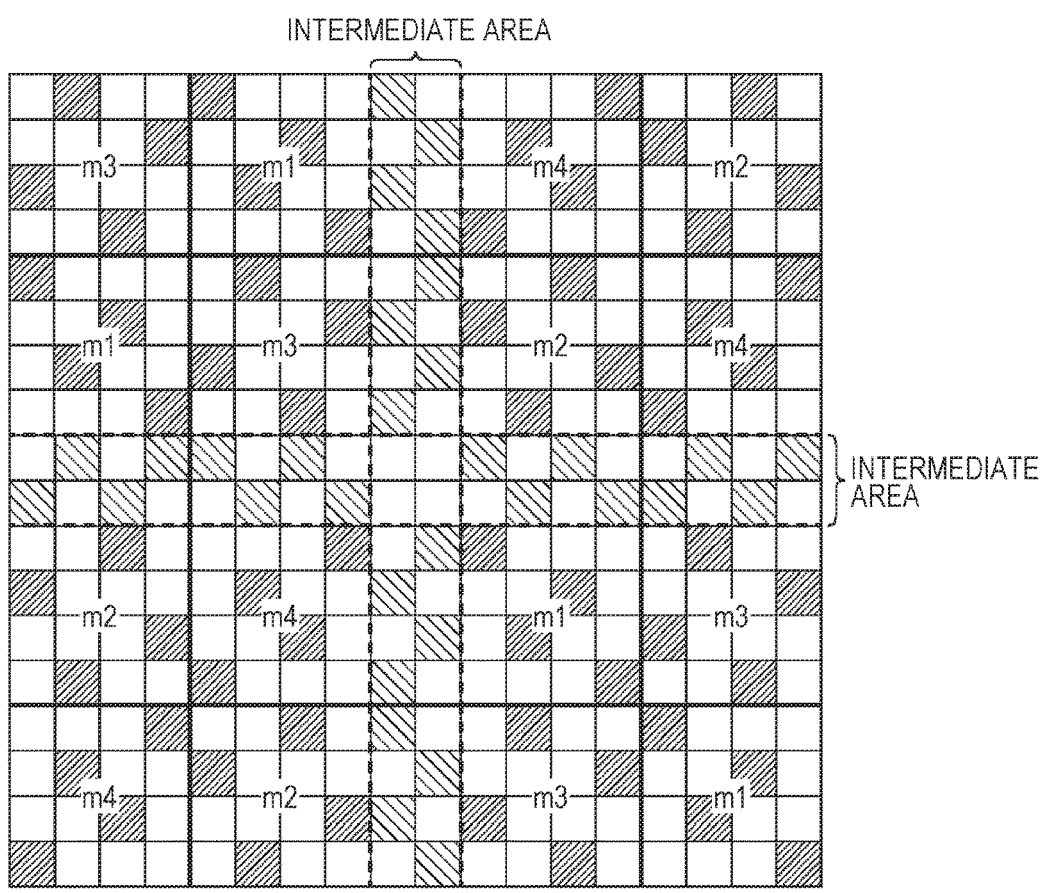
FIG. 17 is a diagram showing square representation of an example of the uniform, complete orthogonal system of FIG. 16.
FIG. 18 is a diagram showing an example of a tessellation tile with four-pixel leakage for an ADC area of 10×10 pixels.

FIG. 17 shows square representation expressing the tiles m2 to m4 by using the line numbers of the tile m1.

As is apparent from FIGS. 16 and 17, it is clear that the uniform, complete orthogonal system and the square representation of the tiles correspond one-to-one to each other.

The condition for a solution of the n-hisha problem being complete orthogonal is that all of the different numbers appear once when any of vertical columns and horizontal lines is focused on in the square representation of FIG. 17. A square having such a property is known as Latin square.

As described above, the method for generating a uniform, complete orthogonal system includes the method of selecting one solution of the n-hisha problem and one solution of the n-th order Latin square.

A known method for generating a Latin square is an algorithm of cyclic shifting by one. Although studies on good combination have not be thoroughly conducted, an original tile that contains a long oblique line is likely to result in a readily-perceptible great pattern and such a tile is therefore to be avoided and a tile constituted by pixels that are as discrete as possible is to be selected.

The complete orthogonal n-hisha solution is a system constituted by n tiles (n tiles each constituted by n pixels result in n×n pixels, which is equal to the number of pixels in the area). For example, in a case of a leakage of four pixels, since four tiles can be generated for four corners, these tiles can be arranged without any change. In a case of a leakage other than four pixels, the constraint of the n-hisha solution needs to be removed.

For example, in a case of a leakage of three pixels or less, there is a choice of selecting corners to place the tiles. In particular, in a case of a leakage of two pixels, a complete orthogonal system in which one pixel is assigned to each of the corners (shown in FIG. 21) can be selected.

In a case of a leakage of five pixels or more, pixels of tiles other than four tiles selected from the complete orthogonal system will be missing. Specifically, in the complete orthogonal 5-hisha problem when the leakage is five pixels, the shape that is the same as the single unselected tile is coincident with the shape of the missing pixel. Pixels of the unselected tile will be divided and placed somewhere on the four corners.

In the example shown in FIG. 15, regions to which the same index is assigned need to be in the complete orthogonal system, but the same complete orthogonal system need not be used for regions to which different indices are assigned. Even when the same index is used, the order of arrangement need not be the same. According to this flexibility, tessellation tiles that are slightly different from each other can be generated from one complete orthogonal system. The boundary blurring effect, however, will not vary largely by employing tessellation tiles obtained through such modifications.

In a case where a constraint of the numbers of vertical pixels and horizontal pixels in leakage regions of a tessellation tile being constant is added, a tessellation tile can be readily generated from one complete orthogonal system with a leakage of four pixels.

When focus is placed on the periphery of the ADC area of n×n in FIG. 15, if n is an even number, the width n−2m of the intermediate regions is also an even number; the uniformity of the intermediate regions can therefore be achieved by assigning half of n−2m pixels thereto. When focus is placed on the corner regions, both of the indices SW and SE appear twice in the top regions while the indices NW and NE do not, for example. The uniformity in the number of peripheral pixels will therefore be satisfied by selecting tiles so that each of the four tiles of the complete orthogonal system appears once.

FIG. 18 is an example of a tessellation tile with a leakage of four pixels generated according to the aforementioned constraint for an ADC area of 10×10 pixels. Note that the uniform, complete orthogonal system shown in FIG. 16 is used for complete orthogonal tiles. In addition, although tiles of a simple grid pattern are employed in an intermediate area, tiles with which lines are less noticeable may be used instead. The corner shape arrangements in leakage regions are in such a manner that the same regions are placed at one corner and at a diagonal corner thereof. Furthermore, the shapes of the four corners may be such that a combination of corners where all the regions appear may be selected.

Next, samples of pattern noise in cases where the tessellation tiles shown in FIG. 18 are employed will be shown.

Figure 19:
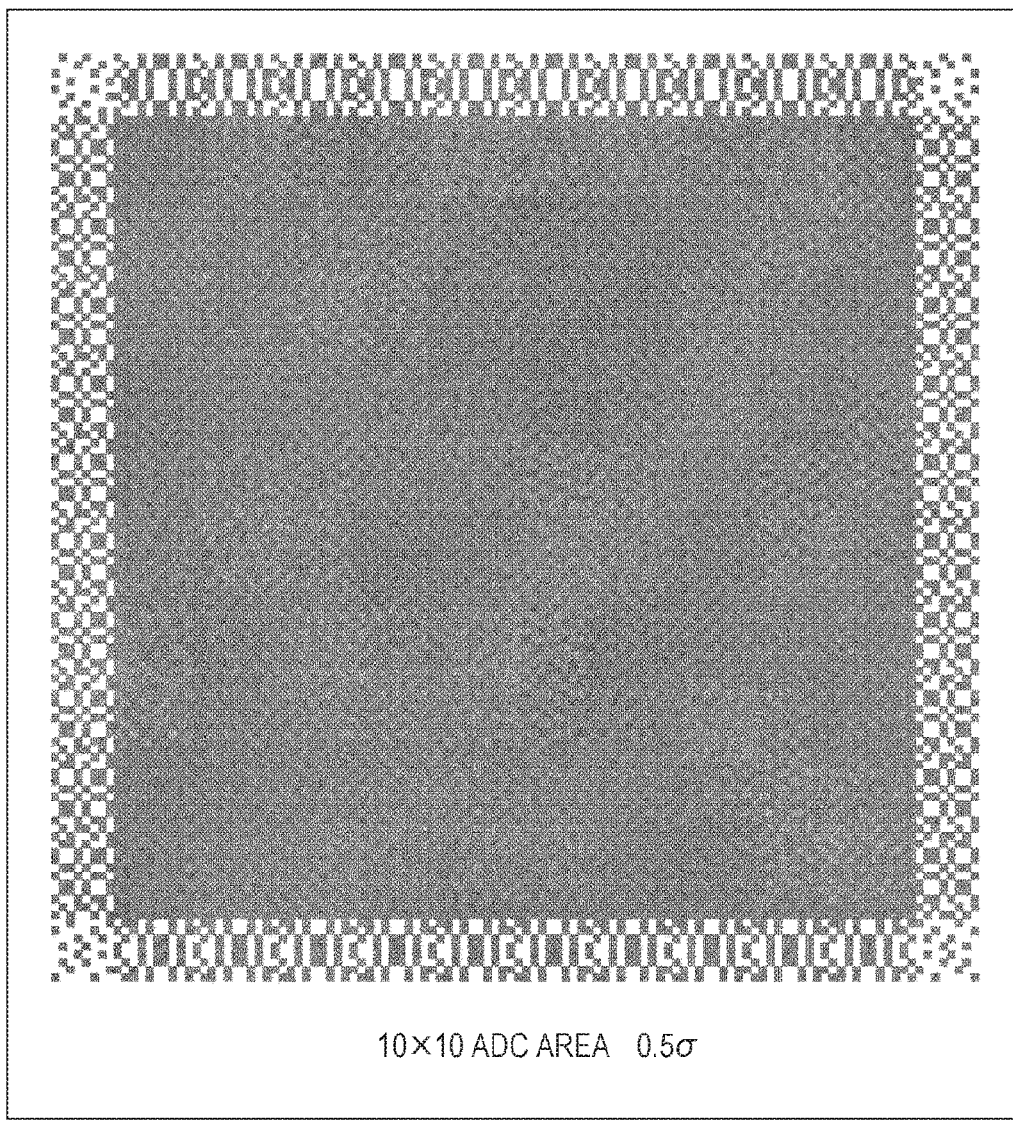
FIG. 19 is a drawing in which the tessellation tiles with four-pixel leakage of FIG. 18 are arranged.

FIG. 19 shows differences in offset among tessellation tiles in grayscale where the tessellation tiles with four-pixel leakage shown in FIG. 18 are arranged and each of the tessellation tiles has an offset according to Gaussian distribution with 0.5 σ.

Figure 20:
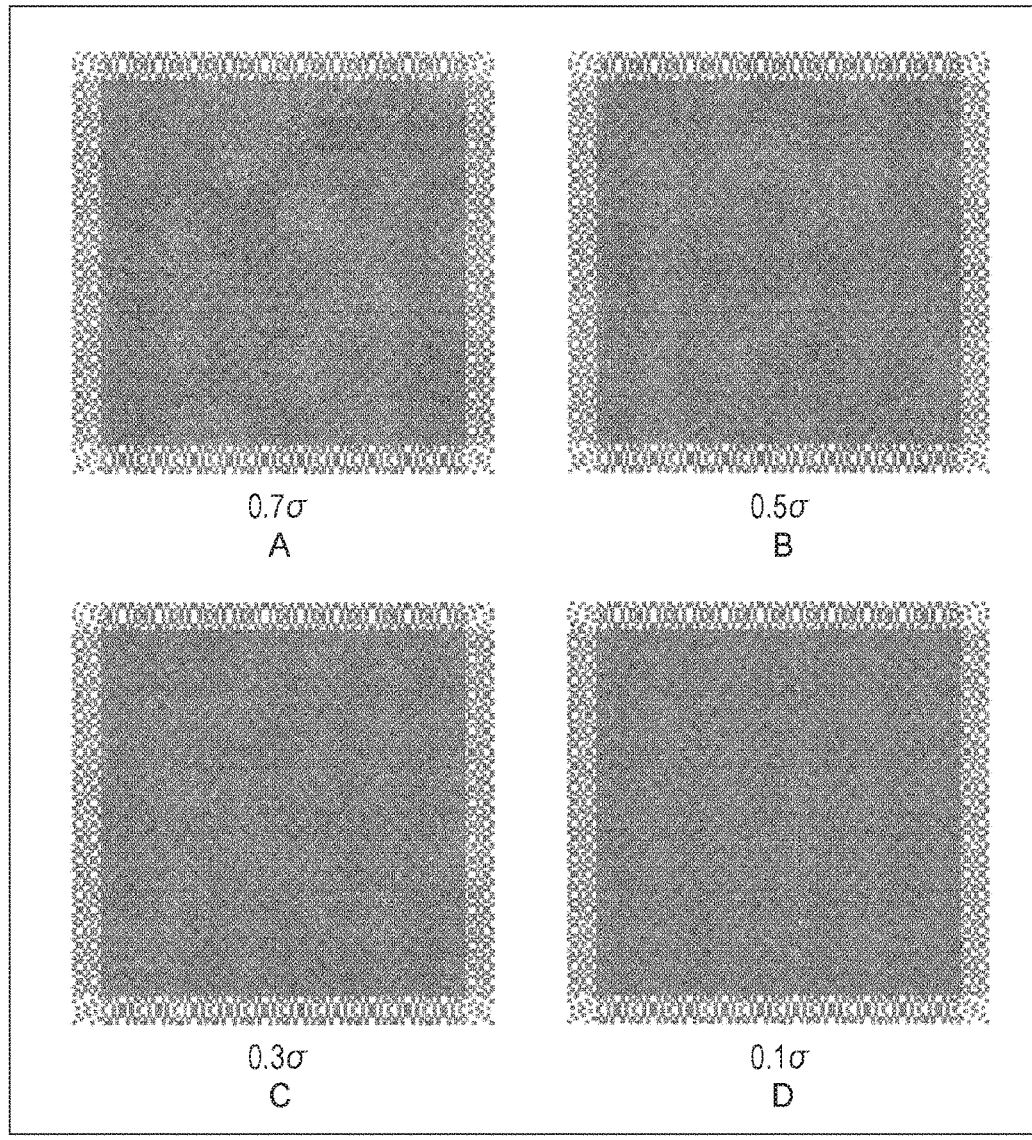
FIG. 20 is a drawing showing pattern noise in a case where the tessellation tiles with four-pixel leakage of FIG. 18 are employed.

FIG. 20 is obtained by adding Gaussian noise (random noise) with 0.5 σ added to each pixel to pattern noise corresponding to the tessellation tiles of FIG. 18. Note that the pattern noise has 0.7 σ in FIG. 20A, the pattern noise has 0.5 σ in FIG. 20B, the pattern noise has 0.3 σ in FIG. 20C, and the pattern noise has 0.1 σ in FIG. 20D, and that the random noise of pixels obtained by the addition is not common but is generated at each addition.

When the random noise and the pattern noise both have 0.5 σ as shown in FIG. 20B, the boundaries of the tessellation tiles can be blurred to such an extent that the boundaries can be noticed by careful observation. When the pattern noise has 0.1 σ as shown in FIG. 20D, it can be seen that the boundaries of the tessellation tiles are not noticeable at all. Specifically, in order to make pattern noise less noticeable in the related art, it has been considered that the noise level thereof needs to be lowered to a pixel level of 1/10 or lower; by employing the tessellation tiles in the embodiment, however, it is deemed that the noise level of the pattern noise need not be lowered to such an extent.

Next, the fact that the tessellation tiles with two-pixel leakage in the case where the ADC area is constituted by 4×4 pixels as shown in FIG. 14 can be generated by combination of tiles of 2×2 pixels in a complete orthogonal system will be shown.

Figure 21:
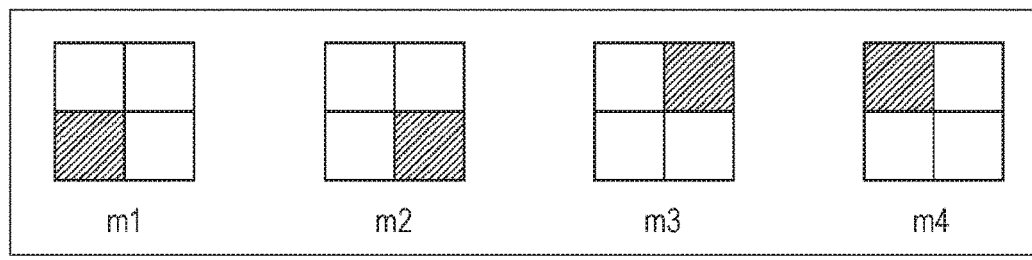
FIG. 21 is a diagram showing examples of complete orthogonal system tiles of 2×2 pixels.
Figures 22, 23:
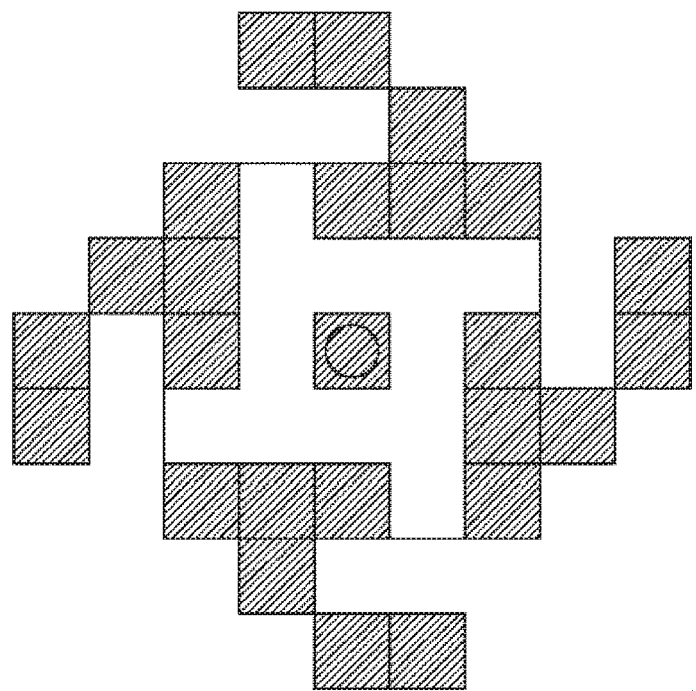
FIG. 22 is a diagram showing square representation in a case where the tessellation tile of FIG. 14 is constituted by the complete orthogonal system tiles of FIG. 21.
FIG. 23 shows an example of a tessellation tile with two-pixel leakage corresponding to an ADC area of 5×5 pixels.

FIG. 21 shows tiles m1, m2, m3, and m4 of 2×2 pixels in a complete orthogonal system. FIG. 22 shows square representation in a case where the tessellation tile of FIG. 14 is generated by combining the tiles m1 to m4 in the complete orthogonal system shown in FIG. 21, where it can be seen that the square representation is Latin square.

<Exception of Tessellation Tile Shape>

The cases where tessellation tiles of one shape fill the screen have been heretofore described. Hereinafter, a case where the shapes of adjacent tessellation tiles are different in such a manner that the shapes are complementary to each other, for example, will be described.

To begin the description, one tessellation tile is shown in FIG. 23. FIG. 23 is an example of a tessellation tile with two-pixel leakage corresponding to an ADC area of 5×5 pixels. The tessellation tile in FIG. 23 can be generated by the tessellation tile generation process described with reference to FIG. 12, for example.

Figure 24:
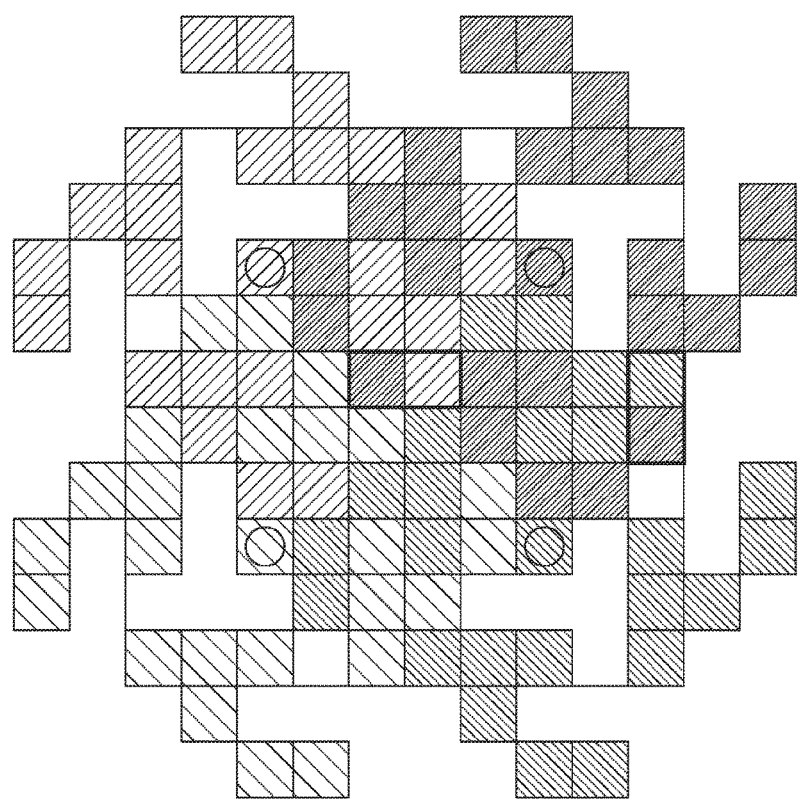
FIG. 24 is a diagram showing a state in which four tessellation tiles of FIG. 23 are combined.

Next, FIG. 24 shows a state in which the tessellation tile of FIG. 23 is translated and the four resulting tessellation tiles are combined. If the shape shown in FIG. 24 is regarded as one tessellation tile, then this means that a tessellation tile with two-pixel leakage corresponding to an ADC area of 10×10 pixels is generated.

In this manner, regarding generation of a tessellation tile, a large tessellation tile can be generated by combining small tessellation tiles, in addition to the tessellation tile generation process described with reference to FIG. 12.

Note that freely selected pixels in the large tessellation tile shown in FIG. 24 can be replaced with each other. In FIG. 24, two pixels in thick black boxes have already been replaced with each other. Note that, even if such a large tessellation tile in which pixels have been replaced with each other as shown in FIG. 24 is divided again into four tiles, these tiles cannot be tessellation tiles.

Thus, an attempt to complement the large tessellation tile shown in FIG. 24 with two types of tiles is considered. When focus is placed on the upper-right tile in FIG. 24, it can be seen that pixels have been replaced in two directions, which are the tile on the left and the tile below. In order to integrate the tiles to generate two types of tiles, the ADC area is assumed to have a black and white pattern similarly to the squares on a chessboard, and the white tiles and the black tiles are adjusted to be complementary at the boundaries between white tiles and black tiles.

Figure 25:
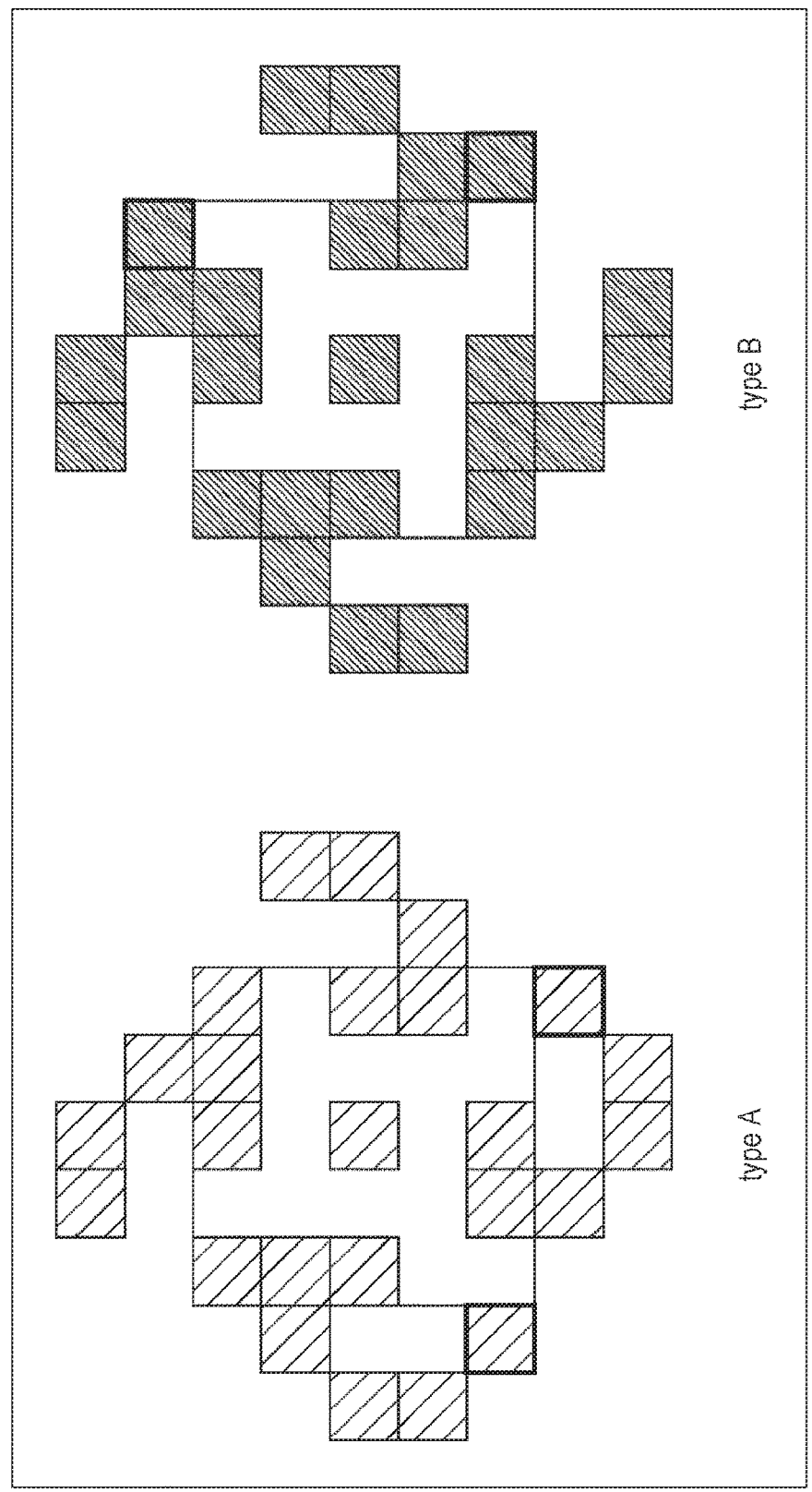
FIG. 25 is a diagram showing two types of tiles complementary to each other and corresponding to the tessellation tile of FIG. 24.

FIG. 25 shows two tiles type A and type B complementary to each other, which are generated by shifting pixels that conflict with each other according to the idea above.

In the complementary tiles type A and type B of FIG. 25, pixels indicated by thick lines are those changed from the pixels in the basic tessellation tile of FIG. 23.

The entire screen can be covered by arranging the complementary tile type B above, below, on the left of, and on the right of the complementary tile type A of FIG. 25 and arranging the complementary tile type A above, below, on the left of, and on the right of the complementary tile type B.

Figure 26:
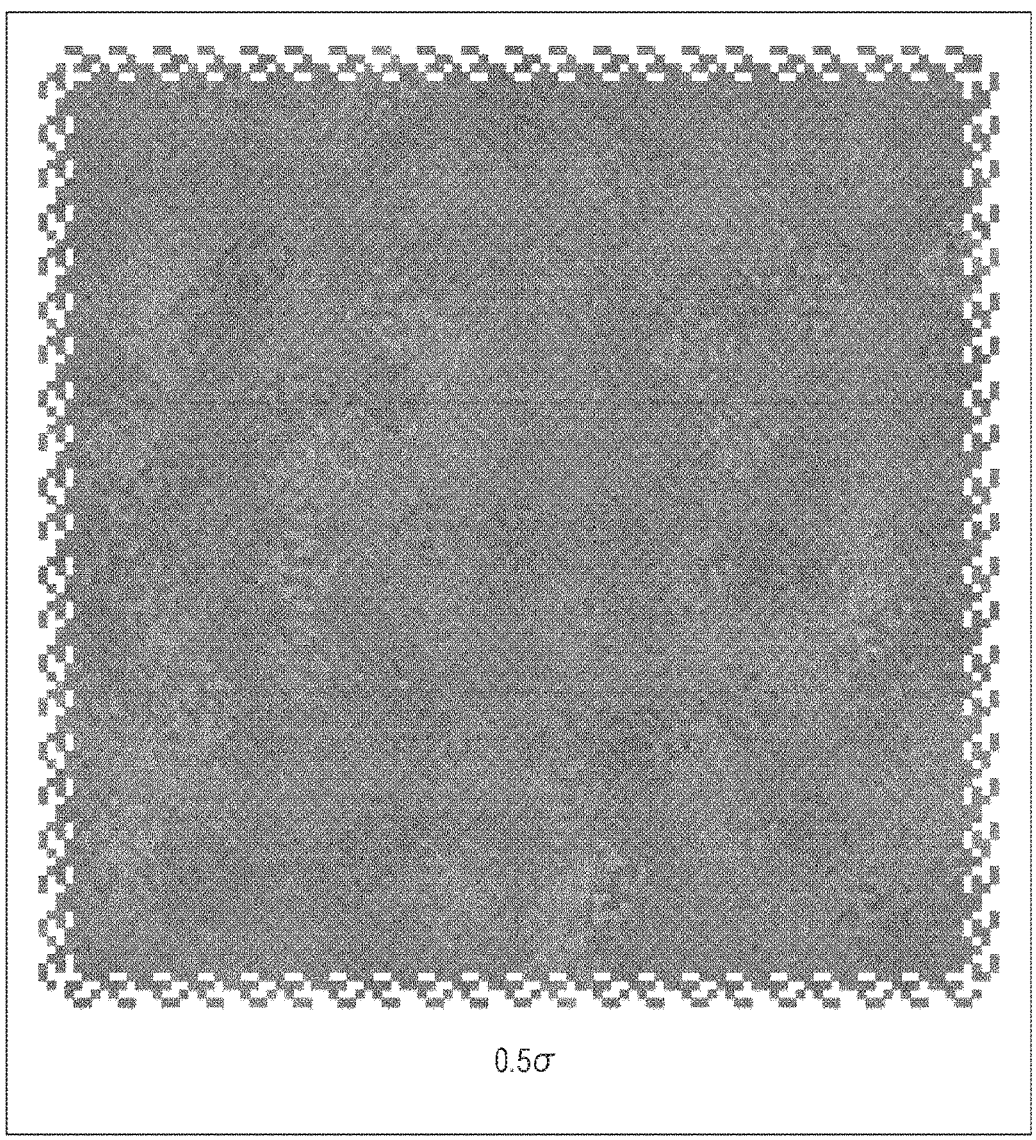
FIG. 26 shows an example of complementary tiles.

FIG. 26 shows differences in offset among tessellation tiles in grayscale where the complementary tiles type A and type B shown in FIG. 25 are arranged and each of the complementary tiles has an offset according to Gaussian distribution with 0.5 σ.

In FIG. 26, oblique block noise is visible, but this is a reflection of a tendency that pixels in the basic tessellation tile concentrate in the center in a diamond shape. The obtained result of the capacity of boundary blurring, which is not shown, was close to that of the tessellation tile with four-pixel leakage of FIG. 19.

SUMMARY

According to the embodiment, in the case of column ADCs, the order in which pixels are read is changed by employing saw textures, while in the case of area ADCs, the tessellation tile is employed, so that pattern noise appearing in a shape of a block, which can be generated in an image output from an image sensor can be made less noticeable.

Note that the present disclosure can be applied not only to cases where pixels output monochromic signals but also cases where pixels output color signals of a Bayer array and cases where interpolated reading is performed. An original reading pattern may be considered so that pixel arrangement resulting from image processing provides a pattern that is difficult for a human to perceive.

Techniques for rearranging read data into pixel arrangement have not been mentioned herein, and the simplest technique may be using a frame memory to generate a sequence for reading addresses of areas handling the respective pixels.

<Example Structure of Computer to Perform Tessellation Tile Generation Process>

The tessellation tile generation process described above can be performed by either hardware or software. When the tessellation tile generation process is to be performed by software, programs constituting the software are installed in a computer. Note that examples of the computer include a computer embedded in dedicated hardware and a general-purpose personal computer capable of executing various functions by installing various programs therein.

Figure 27:
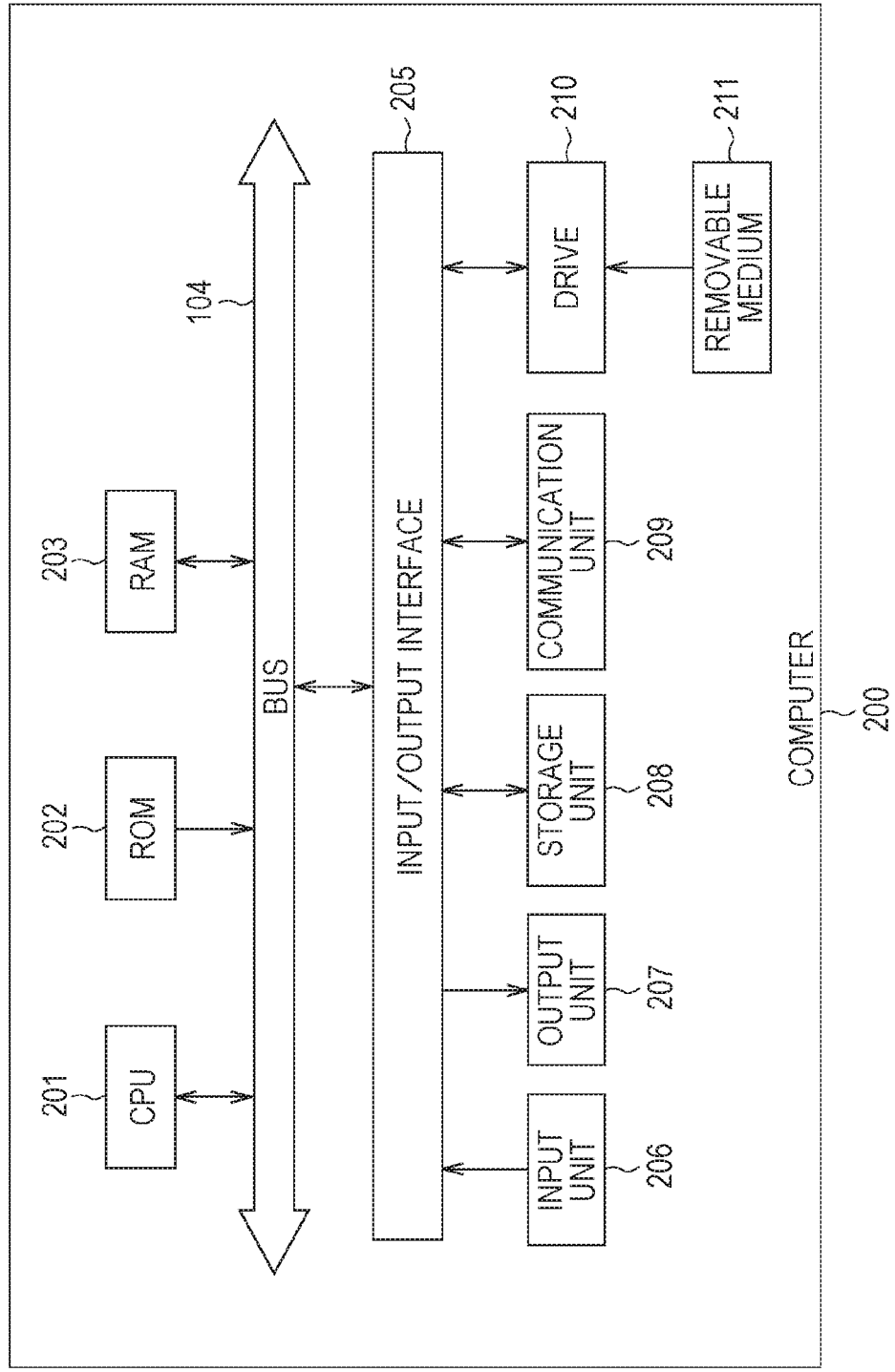
FIG. 27 is a block diagram showing an example structure of a computer.

FIG. 27 shows an example structure of the hardware of a computer that performs the above-described tessellation tile generation process in accordance with programs.

In a computer 200, a CPU (central processing unit) 201, a ROM (read only memory) 202, and a RAM (random access memory) 203 are connected to one another by a bus 204.

An input/output interface 205 is further connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a speaker, and the like. The storage unit 208 may be a hard disk, a nonvolatile memory, or the like. The communication unit 209 may be a network interface or the like. The drive 210 drives a removable medium 211 such as a magnetic disk, an optical disk, a magnetooptical disk, or a semiconductor memory.

In the computer 200 having the above described structure, the CPU 201 loads a program stored in the storage unit 208 into the RAM 203 via the input/output interface 205 and the bus 204 and executes the program, for example, so that the above described tessellation tile generation process is performed.

Programs to be executed by the computer 200 may be programs for carrying out processes in chronological order in accordance with the sequence described in this specification, or programs for carrying out processes in parallel or at necessary timing such as in response to a call.

Embodiments of the present disclosure are not limited to the embodiment described above, but various modifications may be made thereto without departing from the scope of the disclosure.

The present disclosure can also have the following structures.

(1)

An image sensor including analog digital converters (ADCs), each of the ADCs being provided for a column, wherein the ADCs associated with the respective columns are configured to read charge signals simultaneously from pixels arranged on lines different from one another of the respectively associated columns, the number of ADCs being a predetermined number corresponding to the number of columns, the columns being adjacent to one another.

(2)

The image sensor described in (1), wherein the predetermined number of ADCs associated with the predetermined number of columns adjacent to one another are configured to read charge signals simultaneously from pixels being arranged on lines of the respectively associated columns, each of the pixels being on a line shifted by one line from that on adjacent one column.

(3)

The image sensor described in (1) or (2), wherein the ADC associated with any one of the columns is configured to read a charge signal also from a pixel placed on a column other than the associated column.

(4)

The image sensor described in (3), wherein the ADC associated with any one of the columns is configured to read charge signals continuously from a plurality of pixels arranged on lines, different from one another, of a plurality of columns.

(5)

The image sensor described in (3) or (4), wherein the ADC associated with any one of the columns is configured to read charge signals continuously from a plurality of pixels arranged on lines, each of the pixels being on a line shifted by one line from that on adjacent one column.

(6)

An electronic device including an image sensor, wherein
the image sensor includes analog digital converters (ADCs), each of the ADCs being provided for a column, and
the ADCs associated with the respective columns are configured to read charge signals simultaneously from pixels arranged on lines different from one another of the respectively associated columns, the number of ADCs being a predetermined number corresponding to the number of columns, the columns being adjacent to one another.

(7)

An image sensor including analog digital converters (ADCs), each of the ADCs being provided for an area constituted by a plurality of pixels, wherein
arrangement of pixels from which charge signals are to be read by one of the ADCs is in a form of a tessellation tile translated to cover a screen in such a manner that pixels on same coordinates do not overlap with each other.

(8)

The image sensor described in (7), wherein the tessellation tile is translated to cover the screen entirely except a periphery of the screen in such a manner that pixels on same coordinates do not overlap with each other.

(9)

An electronic device including an image sensor, wherein
the image sensor includes analog digital converters (ADCs), each of the ADCs being provided for an area constituted by a plurality of pixels, and
arrangement of pixels from which charge signals are to be read by one of the ADCs is in a form of a tessellation tile translated to cover a screen in such a manner that pixels on same coordinates do not overlap with each other.

(10)

A method for generating a tessellation tile, the tessellation tile representing arrangement of pixels handled by an area analog digital converter (ADC), the method including:
a first attaching step of attaching indices to n×n pixels constituting an original ADC area by an information processing device;
a second attaching step of attaching the same indices as those of the original ADC area to pixels in a neighboring ADC area obtained by translating the original ADC area; and
a moving step of moving a given number of pixels in the original ADC area to positions of pixels to which the same indices are assigned in the neighboring ADC area.

REFERENCE SIGNS LIST

10 Saw texture
11 Selection signal wiring
21 VSL
22 Selector switch
31 Tessellation tile
200 Computer
201 CPU

The invention claimed is:

1. An image sensor, comprising:
a plurality of lines; and
a plurality of analog digital converters (ADCs), wherein
    each ADC of the plurality of ADCs is associated with a column of a plurality of columns,
    the plurality of ADCs is configured to read charge signals simultaneously from a plurality of pixels arranged on the plurality of lines,
    the plurality of pixels to be read simultaneously is alternately arranged on a first line of the plurality of lines and a first column of the plurality of columns, a second line shifted upward by one line from the first line and a second column of the plurality of columns, and a third line shifted downward by one line from the first line and a third column of the plurality of columns, and
    a number of the plurality of ADCs corresponds to a number of the plurality of columns.

2. The image sensor according to claim 1, wherein
an ADC of the plurality of ADCs is associated with the first column of the plurality of columns,
the ADC is configured to read a charge signal from a second pixel on a second column of the plurality of columns, and
the second column is different from the first column.

3. The image sensor according to claim 2, wherein
the ADC associated with the first column of the plurality of columns is further configured to read the charge signals continuously from the plurality of pixels on the plurality of lines.

4. The image sensor according to claim 1, wherein an ADC associated with one column of the plurality of columns is configured to read the charge signals continuously from the plurality of pixels arranged on the plurality of lines.

5. The image sensor according to claim 1, wherein the plurality of pixels are arranged in a saw texture.

6. The image sensor according to claim 1, further comprising an auxiliary circuit configured to generate a potential to be read by one of the plurality of ADCs, wherein the auxiliary circuit is on an edge area outside an area of the plurality of pixels.

7. The image sensor according to claim 1, further comprising a plurality of selector switches configured to switch among the plurality of lines, wherein each selector switch of the plurality of selector switches is connected to a respective ADC of the plurality of ADCs.

8. An electronic device, comprising:
an image sensor, wherein the image sensor includes:
    a plurality of lines; and
    a plurality of analog digital converters (ADCs), wherein
    each ADC of the plurality of ADCs is associated with a column of a plurality of columns,
    the plurality of ADCs is configured to read charge signals simultaneously from a plurality of pixels arranged on the plurality of lines,
    the plurality of pixels to be read simultaneously is alternately arranged on a first line of the plurality of lines and a first column of the plurality of columns, a second line shifted upward by one line from the first line and a second column of the plurality of columns, and a third line shifted downward by one line from the first line and a third column of the plurality of columns, and a number of the plurality of ADCs corresponds to a number of the plurality of columns.

* * * * *